(12) United States Patent
Nagata et al.

(10) Patent No.: US 7,698,387 B2
(45) Date of Patent: Apr. 13, 2010

(54) SERVER SYSTEM, USER TERMINAL, SERVICE PROVIDING METHOD AND SERVICE PROVIDING SYSTEM USING THE SERVER SYSTEM AND THE USER TERMINAL FOR PROVIDING POSITION-BASED SERVICE TO THE USER TERMINAL

(75) Inventors: Nami Nagata, Kawasaki (JP);
Shinichiro Mori, Kawasaki (JP);
Keitaro Ohno, Kawasaki (JP); Yukio Hirokawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 909 days.

(21) Appl. No.: 11/001,691

(22) Filed: Dec. 1, 2004

(65) Prior Publication Data
US 2006/0031410 A1 Feb. 9, 2006

(30) Foreign Application Priority Data
Jul. 6, 2004 (JP) .............................. 2004-228739

(51) Int. Cl.
*G06F 15/16* (2006.01)
(52) U.S. Cl. .................. 709/219; 709/203; 709/217; 709/227; 709/229; 707/9; 707/10
(58) Field of Classification Search .......... 709/203, 709/217–219, 223–224, 226, 229; 707/9, 707/10
See application file for complete search history.

(56) References Cited

U.S. PATENT DOCUMENTS 5,926,116 A 7/1999 Kitano et al.
6,121,969 A * 9/2000 Jain et al. .................... 715/850
6,173,239 B1 * 1/2001 Ellenby ....................... 702/150
6,396,475 B1 * 5/2002 Ellenby et al. .............. 345/156

(Continued)

FOREIGN PATENT DOCUMENTS

EP 0 785 535 7/1997

(Continued)

OTHER PUBLICATIONS

European Search Report dated Oct. 12, 2007, from the corresponding European Application.

(Continued)

*Primary Examiner*—Shawki S Ismail
(74) *Attorney, Agent, or Firm*—Katten Muchin Rosenman LLP

(57) ABSTRACT

In a service providing system, a first database holds plural kinds of balloon data, in which each of plural pieces of three-dimensional real space range information and an identifier for identifying the three-dimensional real space range information is related, and a second database holds a service execution file in which each of plural pieces of three-dimensional space region information related to each identifier and service information in each three-dimensional space region are related. An extracting unit extracts, using position on a user terminal and an identifier, a service execution file corresponding to a three-dimensional space region. A service execution processing unit performs an executing process of a service corresponding to service information held in the extracted service execution file. The service system provides various kinds of services information at any time, effectively use the hardware, and limit the access. The user obtains service information available in a wide area.

32 Claims, 33 Drawing Sheets

U.S. PATENT DOCUMENTS

| | | | |
|---|---|---|---|
| 6,480,857 B1* | 11/2002 | Chandler | 707/100 |
| 6,577,330 B1* | 6/2003 | Tsuda et al. | 715/782 |
| 6,978,295 B2* | 12/2005 | Meifu et al. | 709/217 |
| 7,051,291 B2* | 5/2006 | Sciammarella et al. | 715/838 |
| 7,096,233 B2 | 8/2006 | Mori et al. | |
| 7,533,079 B2* | 5/2009 | Naito et al. | 707/2 |
| 2001/0050687 A1* | 12/2001 | Iida et al. | 345/581 |
| 2002/0046212 A1 | 4/2002 | Meifu et al. | |
| 2002/0103781 A1 | 8/2002 | Mori et al. | |
| 2002/0103911 A1* | 8/2002 | Meifu et al. | 709/227 |
| 2003/0164827 A1* | 9/2003 | Gottesman et al. | 345/419 |
| 2003/0179231 A1* | 9/2003 | Kamiwada et al. | 345/757 |
| 2007/0070066 A1* | 3/2007 | Bakhash | 345/419 |

FOREIGN PATENT DOCUMENTS

| | | |
|---|---|---|
| EP | 1 199 646 | 4/2002 |
| EP | 1 251 439 | 10/2002 |
| JP | 2002-132806 | 5/2002 |
| JP | 2002-229991 | 8/2002 |
| JP | 2003-36365 | 2/2003 |
| JP | 2003-114136 | 4/2003 |
| JP | 2003-178084 | 6/2003 |
| WO | WO 00/77662 | 12/2000 |
| WO | 02/059716 A2 | 8/2002 |

OTHER PUBLICATIONS

European Search Report dated Dec. 15, 2005.

Hiroyuki Tarumi et al. Communication through Virtual Active Objects Overlaid onto the Real World. Proceedings of the 3$^{rd}$ International Conference on Collaborative Virtual Environments. Sep. 10, 2000.

Hiroyuki Tarumi et al. Public Applications of SpaceTag and Their Impacts. Lecture Notes in Computer Science, Springer Verlag, vol. 1765, 2000.

Yahiko Kambayashi, et al. Digital Tags: Data with Restricted Accessibility for e-Commerce Applications. Information Technology for Virtual Enterprises, 2001 Jan. 2001.

Hiroyuki Tarumi et al. Spacetag: An Overlaid Virtual System and its Applications. Multimedia Computing Systems, 1999 vol. 1, Jun. 7, 1999.

Hiroyuki Tarumi, et al Spacetag: Objects with Spatio-Temporally Limited Access. Dec. 1998.

Notice of Reasons for Rejection dated Jan. 19, 2010, from the corresponding Japanese Application No. 2004-228739.

* cited by examiner

| BALLON NUMBER | SPATIAL RANGE INFORMATION | URL |
| --- | --- | --- |
| 1 | A/X/0/3 | http://www.xxx.100 |
| 2 | A/X/3/1 | http://www.xxx.101 |
| 3 | A/X/2/1 | http://www.xxx.102 |
| 4 | A/X/1/1 | http://www.xxx.103 |
| 5 | B/X/0/2 | http://www.xxx.200 |
| 6 | B/X/2/1 | http://www.xxx.201 |
| 7 | B/X/1/1 | http://www.xxx.202 |
| 8 | C/X/0/3 | http://www.xxx.300 |
| 9 | D/X/0/4 | http://www.xxx.400 |
| 10 | A-1/X/1/0.5 | http://www.xxx.110 |
| 11 | 1/X/1/0.5 | http://www.xxx.111 |
| 12 | A+1/X/1/0.5 | http://www.xxx.112 |
| 13 | A-1/X/2/0.5 | http://www.xxx.120 |
| 14 | A/X/2/0.5 | http://www.xxx.121 |
| 15 | A/X/3/0.5 | http://www.xxx.130 |
| 16 | D/X/4/0.5 | http://www.xxx.410 |
| 17 | D/X/4/0.5 | http://www.xxx.411 |

FIG. 6

REAL SPACE: SPACE FORMED IN REAL WORLD

UBIQUITOUS SPACE: REAL SPACE PROVIDING SERVICES

VIRTUAL SPACE: SPACE FORMED INSIDE DATABASE

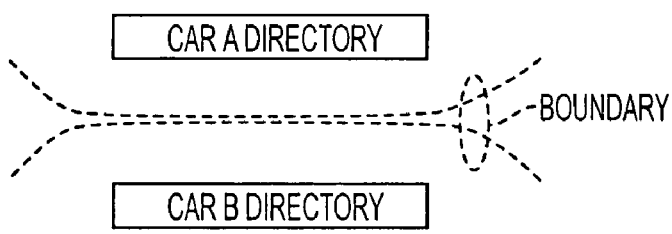
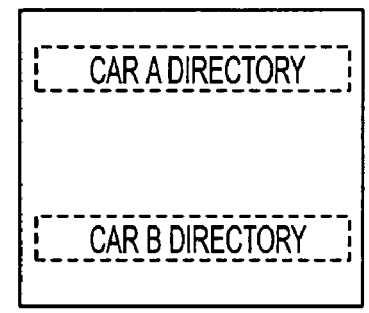
FIG. 17A
FIG. 17B

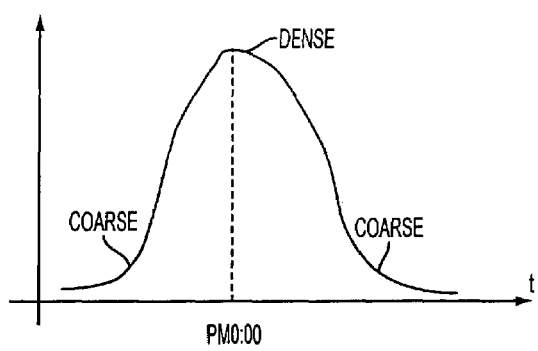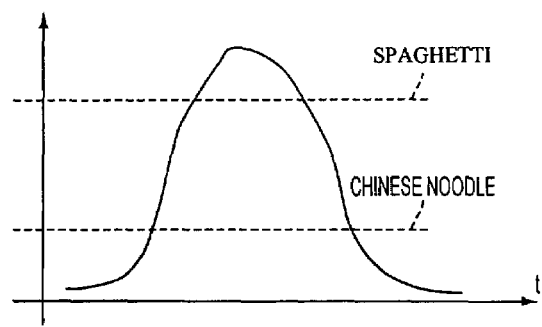
FIG. 20A                    FIG. 20B

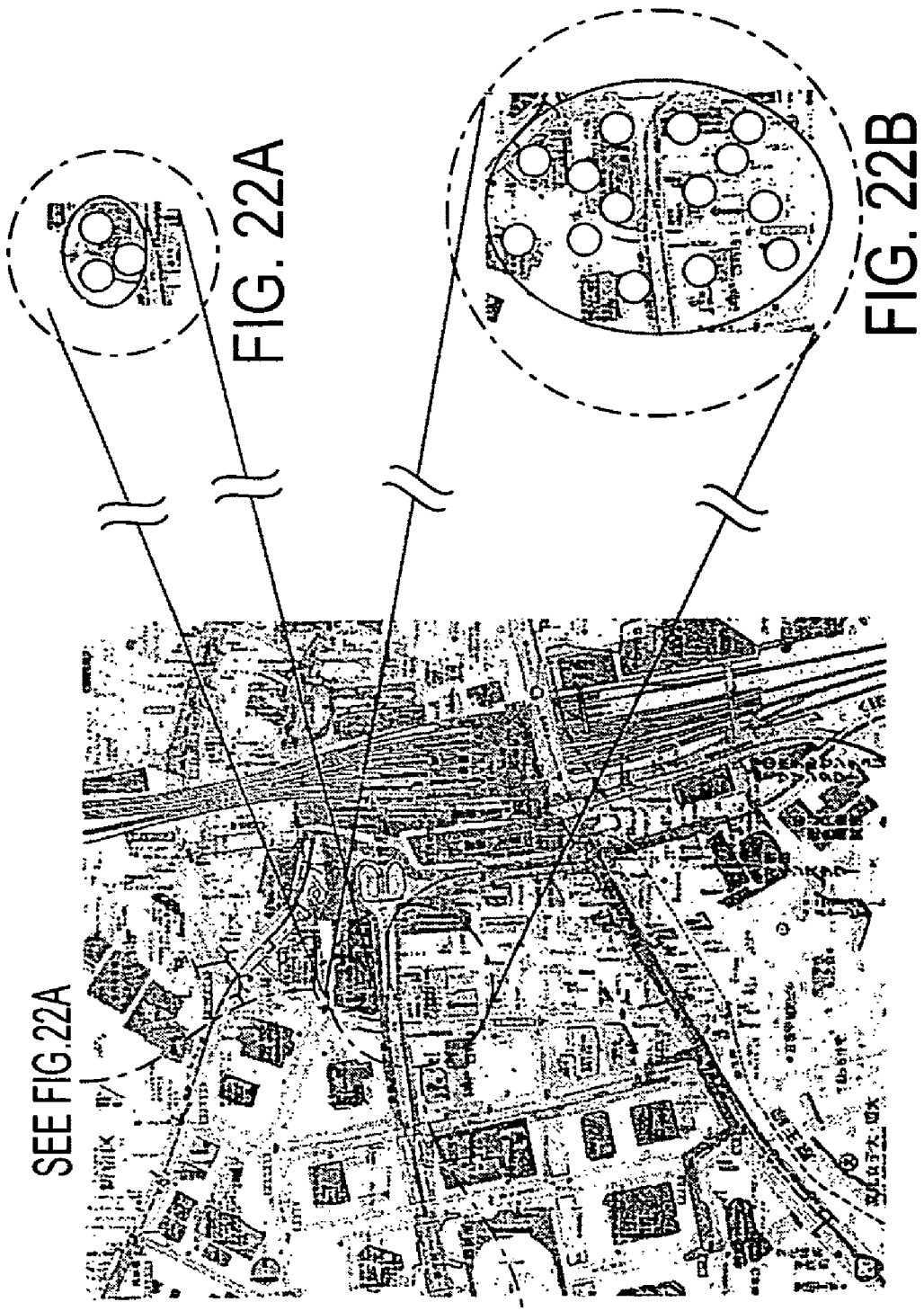

SERVER SYSTEM, USER TERMINAL, SERVICE PROVIDING METHOD AND SERVICE PROVIDING SYSTEM USING THE SERVER SYSTEM AND THE USER TERMINAL FOR PROVIDING POSITION-BASED SERVICE TO THE USER TERMINAL

BACKGROUND OF THE INVENTION (1) Field of the Invention

The present invention relates to a server system, a user terminal, and a service providing method and service providing apparatus using the server system and the user terminal suitable for use in an information delivering system using, for example, a portable terminal.

(2) Description of Related Art

With development of mobile communications, contents of services provided from the provider to the users diversify. For example, navigation service and the like are developed. It is said that the final object of the mobile communications is that anyone can communicate with someone at any place at any time. For this purpose, the ubiquitous space has been proposed.

The applicant of this application has proposed an information providing service, wherein the user obtains information about a menu, the degree of crowdedness and the like of a restaurant which is a tenant of a building located within the sight of the user, using a user terminal of the user (refer to, for example, patent document 1). The information providing service system described in the patent document 1 has a user terminal having a positioning function, and a server system holding a database in which a specific region (a restaurant on the ninth floor of the building or the like) in three-dimensional real space and service information (a menu of the restaurant, comments, etc.) defined in a virtual space linked to the specific region are related to each other. When the user points the user terminal to the ninth floor of the building and presses a positioning button (retrieving button), the user terminal positions position information (latitude, longitude, altitude, azimuth, tilt angle and the like) and transmits the positioned position information to the server system. When receiving the position information, the server system transmits plural pieces of service information retrieved on the basis of the position information to the user terminal.

In the database to which the user accesses, a specific space in three-dimensional apace is formed in a virtual space called balloon data (bubble data), and buildings, restaurants, etc. are recreated using the balloon data. The server system uses position information on the user terminal as a tag for retrieval (position information tag) when retrieving service information in the database.

Techniques relating time-space have been proposed (refer to, for example, non-patent document 1). A system described in the non-patent document uses an object called SpaceTag which can be accessed in limited time-space. "SpaceTag" is arbitrary information such as text, picture, voice, program, etc., which is accessible at a specific place and time. The user browses the information, using a terminal for "SpaceTag" having a time-space coordinates line (for example, watch and GPS).

Patent Document: Japanese Unexamined Patent Publication No. 2002-132806

Non-patent Document: "SpaceTag: Objects with Spatio-Temporally Limited Access", Interactive System and Software VI, Kindai Kagakusha, pp. 1-10, December 1998, Tarumi, Morishita, Nakao, Kamibayashi.

However, the service by the above system is only offer of information on menu and the like. Additionally, the database uses only position information as a retrieving tag, thus the position information is used as only a tag. Thus, the database is used within a limited range. The database holds a number of pieces of service information, but does not define relationships among the plural pieces of the service information. Accordingly, the above system has a disadvantage that the system cannot provide, at any time, service information having high utility value obtained by uniting plural pieces of service information to the user.

When the user obtains the above service information by retrieving in the database, the retrieval tag (retrieval index) for retrieving in the database is only position information on the user terminal. In order to provide service information that is available by the user in a wide area, it is necessary to widen the area of the position information used as the retrieval tag, which is difficult to be put in practice, and is difficult to effectively use the storing area of the database.

When it is desired to develop various information providing services, there is possibility that an increase in information service causes an increase in information quantity, which further causes lack of the information processing performance of the server system because information about "in which area," "what service," and so forth is not available. Further, since the database holds only information about "accessed/not accessed", there is a problem that there is no way of limiting the number of accesses.

SUMMARY OF THE INVENTION

In the light of the above problems, an object of the present invention is to provide a server system, a user terminal, and a service proving method and service providing system using the server system and the user terminal, whereby the server system can provide various kinds of service information to the user, the user can obtain service information available in a wide area, the hardware can be effectively used, and the server system can limit accesses from the user as required, in an information delivering system.

(1a) Therefore, the present invention provides a server system in a system providing services to a user terminal comprising a first database for holding plural kinds of balloon data, in which each of plural pieces of three-dimensional real space range information and an identifier for identifying the three-dimensional real space range information is related to each other, a second database for holding one or a plurality of service execution files, in which each of plural pieces of three-dimensional space region information related to the identifier in the first database and service information provided in each three-dimensional space region is related to each other, an extracting unit for extracting, on the basis of position information on the user terminal and an identifier held in the first database, a service execution file corresponding to a three-dimensional space region related to the identifier in the one or plural service execution files in the second database, and a service execution processing unit for performing an executing process of a service corresponding to service information held in the service execution file extracted by the extracting unit.

(1b) The present invention further provides a server system making an apparatus other than a user terminal execute a service that a user of the user terminal requests in response to a request from the user terminal, the server system comprising a storing means for relating three-dimensional real space information on the apparatus to the apparatus, and storing the information, an obtaining means for obtaining position information on the user terminal, and a controlling means for identifying an apparatus which is to execute the service that the user requests by the position information on the user terminal obtained by the obtaining means and three-dimensional space information stored in the storing means, and making the identified apparatus execute the service.

(1c) The present invention still further provides a server system making an apparatus other than a user terminal execute a service in response to a request from the user terminal, the server system comprising a storing means for relating three-dimensional real space information on a plurality of apparatuses to the former apparatus, and storing the information, an obtaining means for obtaining position information on the user terminal, and a controlling means for identifying a first apparatus having information necessary to executing the service that the user requests by the position information on the user terminal obtained by the obtaining unit and three-dimensional space information stored in the storing means, identifying a second apparatus for executing the service that the user requests by another position information obtained thereafter and the three-dimensional space information stored in the storing means, and making the second apparatus execute the service by using the information necessary to execute the service of the first apparatus.

(1d) The present invention still further provides a service providing system which provides services from a server system to a user terminal, the server system comprising a first database for holding plural kinds of balloon data, in which each of plural pieces of three-dimensional real space range information and an identifier for identifying the three-dimensional real space range information are related to each other, a second database holding one or a plurality of service execution files, in which each of plural pieces of three-dimensional space region information related to the identifier in the first database and service information provided in each three-dimensional space region are related to each other, a positioning unit for positioning position information on the user terminal on the basis of light and ultrasonic wave transmitted from the user terminal, an extracting unit for extracting, on the basis of the position information positioned by the positioning unit and an identifier held in the first database, a service execution file corresponding to a three-dimensional space region related to the identifier among the one or plural service execution files in the second database, a service execution processing unit for performing an executing process of a service corresponding to service information held in the service execution file extracted by the extracting unit, the user terminal comprising a light/ultrasonic wave transmitting unit for transmitting the light and ultrasonic wave, a transmitting unit for transmitting data relating to the service operated by a user of the user terminal to the server system, and a receiving unit for receiving information relating to a service executed by the server system on the basis of the light and ultrasonic wave transmitted from the light/ultrasonic wave transmitting unit.

(1e) The present invention still further provides a server system making an apparatus other than a user terminal execute a service that the user of the user terminal requests in response to a request from the user terminal, the server system comprising a storing means for relating three-dimensional real space information on the other apparatus to the apparatus and storing the information, an obtaining means for obtaining position information on the user terminal, and a controlling means for identifying an apparatus which is to execute the service that the user requests by the position information on the user terminal obtained by the obtaining means and the three-dimensional space information stored in the storing means, and making the identified apparatus execute the service.

Accordingly, the server system of this invention can provide at any time various service information to the user, and enables efficient use of the hardware.

(2) The above first database may be structured as described in (2a) and (2b) below.

(2a) The first database holds plural kinds of balloon data, in which each of plural pieces of three-dimensional real space range information including latitude, longitude, altitude and a balloon radius of an object in three-dimensional space and an address related to the object is related to each other, the second database holds one or a plurality of service execution files, in which each of plural pieces of three-dimensional space region information related to an address linked to a three-dimensional real space region in the first database, service information provided in the three-dimensional space region, and one or a plurality of directories are related to one another, the extracting unit extracts a service execution file held in the second database on the basis of position information on the user terminal transmitted from the user terminal or position information positioned by a positioning unit in the system, and an address held in the first database, and the service execution processing unit performs the execution process of a service corresponding to service information held in the service execution file extracted by the extracting unit.

(2b) The first database holds plural kinds of balloon data, in which each of plural pieces of three-dimensional real space range information including latitude, longitude, altitude and a balloon radius of a building in three-dimensional and a uniform resource locator for obtaining service information relating to the building are related to each other, the second database holds one or a plurality of service execution files, in which each of plural pieces of three-dimensional space region information related to the uniform resource locator linked to a three-dimensional real space region in the first database, service information provided in the three-dimensional space region, and one or a plurality of directories having a hierarchical structure are related to one another, the extracting unit extracts, on the basis of position information including at least latitude, longitude and altitude of the user terminal transmitted from the user terminal or position information positioned by a positioning unit in the system on the basis of light and ultrasonic wave transmitted from the user terminal, and a uniform resource locator held in the first database, a service execution file or a directory corresponding to a three-dimensional space region related to the uniform resource locator among the one or plural service execution files or one or plural directories held in the second database, and the service execution processing unit performs the execution process of a service corresponding to service information held in the service execution file or a service execution file in the directory extracted by the extracting unit.

(3) The service execution processing unit may transmit information on a service to be executed to the user terminal.

(4) The above second database may be structured as described in (4a) to (4n) below.

(4a) The second database relates at least each of the plural pieces of three-dimensional space region information to any one of the plural directories hierarchically structured.

(4b) The second database holds at least the plural pieces of three-dimensional space region information in any one of the directories, using a general-purpose OS (Operating System) having a function of managing data, files and directories.

(4c) The second database assigns a file attribute representing whether or not reading and writing are possible to the service information of each of the one or plural service execution files, and holds the plural pieces of three-dimensional space region information.

(4d) The second database assigns each range of the plural directories hierarchically structured on the basis of an area range in three-dimensional real space.

(4e) The second database assigns each range of the plural directories hierarchically structured on the basis of boundary information representing an area range in which a service can be provided.

(4f) The second database holds the one or plural service execution files, adding ambiguity information to the boundary information.

(4g) The second database identifies a directory holding the service execution file by a combination of names of the plural directories hierarchically structured.

(4h) The second database specifies names of the plural directories hierarchically structured on the basis of notation specification of files and directories of the general purpose OS.

(4i) In the second database, each directory is related to one or a plurality of subdirectories in lower hierarchy than the directory.

(4j) The second database holds at least either information depending on three-dimensional space region information of the plural directories hierarchically structured or information not depending on the same with respect to the one or plural service execution files.

(4k) The second database holds a definition file for recording information included in service information formed as a directory.

(4l) The second database further holds service information not related to three-dimensional real space position information of the plural directories hierarchically structured.

(4m) The second database holds together service information related to three-dimensional real space position information of the plural directories hierarchically structured and service information not related to the three-dimensional real space position information.

(4n) The second database holds a device file necessary to reproduce sound, still picture or moving picture in each directory.

(5) The server system may further comprise a filtering unit for filtering the one or plural service execution files held in the second database on the basis of boundary information between the plural directories hierarchically structured. The filtering unit may limit access to the one or plural service execution files held in the second database according to boundary information between the plural directories.

(6) The server system may further comprise an access changing unit for limiting access to the one or plural service execution files held in the second database on the basis of a shape of the boundary information.

(7) The server system may further comprise a measuring unit for measuring statistical information relating to detection of balloons representing an image of space range information, and an estimating unit for estimating position information on the user terminal on the basis of the statistical information measured by the measuring unit.

(8) Additionally, the server system may further comprises a relative relationship defining unit for defining a relative relationship of service information included in the plural service execution files held in the second database. The range of the directory may be changed according to information relating to the quantity of resource of the user terminal transmitted from the user terminal.

(9) The server system may further comprise a service availability determining unit being able to determine whether or not the one or plural service execution files are executable. This service availability determining unit may be structured as described in (9a) to (9c) below.

(9a) The service availability determining unit has an initial file including service information in each directory or accessed from each directory, and comprises an accessing unit for accessing to the plural kinds of balloon data held in the first database to write, in the initial file, service execution propriety information on the one or plural pieces of service information included in the initial file.

(9b) The service availability determining unit determines whether or not the one or plural service execution files are executable by referring to a parameter representing availability of a service given to each of the plural kinds of balloon data held in the first database.

(9c) The service availability determining unit requests a management file of the balloon data to prepare a file describing service availability of a plurality of services belonging to the accessed directory, and determines service availability by referring to the file prepared in response to the request.

(10) The server system may further comprise an authenticating unit for authenticating propriety of service offer to the user terminal.

(11) The server system may further comprise an access controlling unit for setting access limitation to the balloon data held in the first database.

(12) In either the first database or the second database, three-dimensional real space range information can be sequentially changed on the basis of the position information on the user terminal.

(13) The service system may further comprise a remote control unit for notifying the user terminal of one or a plurality of directories having a hierarchy having a depth according to a hierarchy of a directory of the user terminal among the one or plural directories held in the second database.

(14) The present invention provides a user terminal receiving information from a system providing services comprising a position information obtaining unit for obtaining position information on the user terminal, a transmitting unit for transmitting the position information detected by the position information obtaining unit to the system, and a receiving unit for receiving information on a service executed by the system at the position information transmitted from the transmitting unit.

With the user terminal of this invention, the user can obtain service information available in a wide range.

(15) The receiving unit of the user terminal may be structured as described in (15a) and (15b) below.

(15a) The receiving unit receives information on a service executed by the system at the position information transmitted from the transmitting unit on the basis of a database disposed in the system, the database holding one or a plurality of service execution files, in which each of plural pieces of three-dimensional real space range information, an identifier for identifying the three-dimensional real space range information, each of plural pieces three-dimensional space region information related to the identifier and service information provided in each three-dimensional space region are related to one another.

(15b) The receiving unit receives information on a service executed by the system at the position information transmitted from the transmitting unit on the basis of a first database holding plural kinds of balloon data, in which each of plural pieces of three-dimensional real space range information and an identifier for identifying the three-dimensional real space range information are related to each other, and a second database holding one or a plurality of service execution files, in which each of plural pieces of three-dimensional space region information related to the identifier in the first database and service information provided in each three-dimensional space region are related to each other.

(16) The user terminal may further comprise a displaying unit for displaying information on the service received by the receiving unit.

(17) The position information obtaining unit may obtain position information including at least latitude, longitude and altitude of the user terminal.

(18) The present invention still further provides a service providing system providing services from a server system to a user terminal comprising the server system comprising a first database for holding plural kinds of balloon data, in which each of plural pieces of three-dimensional real space range information and an identifier for identifying the three-dimensional real space range information are related to each other, a second database for holding one or a plurality of service execution files, in which each of plural pieces of three-dimensional space region information related to the identifier in the first database and service information provided in each three-dimensional space region are related to each other, an extracting unit for extracting, on the basis of position information on the user terminal and an identifier held in the first database, a service execution file corresponding to a three-dimensional space region related to the identifier among the one or plural service execution files in the second database, a service execution processing unit for executing an executing process of a service corresponding to service information held in the service execution file extracted by the extracting unit, the user terminal comprising a position information obtaining unit for obtaining position information on the user terminal, a transmitting unit for transmitting the position information detected by the position information obtaining unit to the server system, and a receiving unit for receiving information on a service executed by the server system at the position information transmitted from the transmitting unit on the basis of the first database and the second database.

(19) The server system may further comprise a position information correcting unit for inputting corrected position information estimated or compensated on the basis of the position information on the user terminal as position information to the extracting unit.

(20) The present invention still further provides a service providing method for providing services from a server system to a user terminal comprising the steps of, in the user terminal, obtaining, by means of a position information obtaining unit, position information on the user terminal, transmitting, by means of a transmitting unit, the position information detected by the position information obtaining unit to the server system, in the server system comprising a first database holding plural kinds of balloon data, in which each of plural pieces of three-dimensional real space range information and an identifier for identifying the three-dimensional real space range information are related to each other, and a second database holding one or a plurality of service execution files, in which each of plural pieces of three-dimensional space region information related to the identifier in the first database and service information provided in each three-dimensional space range are related to each other, extracting, by means of an extracting unit, a service execution file corresponding to the three-dimensional space range relating to the position information transmitted from the user terminal based on the first and second databases, and executing, by means of a service execution processing unit, a service corresponding to service information held in the service execution file extracted by the extracting unit.

(21) This invention still further provides a service providing method for providing services from a server system to a user terminal comprising the steps of, in the user terminal, transmitting, by means of a light/ultrasonic wave transmitting unit, light and ultrasonic wave, in the server system comprising a first database holding plural kinds of balloon data, in which each of plural pieces of three-dimensional real space range information and an identifier for identifying the three-dimensional real space range information are related to each other, and a second database holding one or a plurality of service execution files, in which each of plural pieces of three-dimensional space region information related to the identifier in the first database and service information provided in each three-dimensional space region are related to each other, positioning, by means of a positioning unit, position information on the user terminal on the basis of light and ultrasonic wave transmitted from the user terminal, extracting, by means of an extracting unit, on the basis of the position information positioned by the positioning unit and an identifier held in the first database, a service execution file corresponding to a three-dimensional space region related to the identifier among the one or plural service execution files in the second database, and executing, by means of a service execution processing unit, a service corresponding to service information held in the service execution file extracted by the extracting unit.

According to the service providing method of this invention, the server system can limit access from the user as required, thus stable system operation becomes possible. Further, the server system can provide various kinds of service information to the user at any time, the user can obtain service information available in a wide area, and the server system can limit access from the user as required.

(22) The present invention still further provides a user terminal receiving information from a system providing services comprising a position information obtaining unit for obtaining position information on the user terminal, a transmitting unit for transmitting the position information detected by the position information obtaining unit to the system, and a receiving unit for receiving information on a service executed by the system at the position information transmitted from the transmitting unit, the receiving unit receiving information on a service executed by the system at the position information transmitted from the transmitting unit on the basis of a database disposed in the system, the database holding one or a plurality of service execution files, in which each of plural pieces of three-dimensional real space range information, an identifier for identifying the three-dimensional real space range information, each of plural pieces three-dimensional space region information related to the identifier and service information provided in each three-dimensional space region are related to one another.

(23) The present invention still further provides a user terminal receiving information from a system providing services comprising a position information obtaining unit for obtaining position information on the user terminal, a transmitting unit for transmitting the position information detected by the position information obtaining unit to the system, and a receiving unit for receiving information on a service executed by the system at the position information transmitted from the transmitting unit, the receiving unit receiving information on a service executed by the system at the position information transmitted from the transmitting unit on the basis of a first database holding plural kinds of balloon data, in which each of plural pieces of three-dimensional real space range information and an identifier for identifying the three-dimensional real space range information are related to each other, and a second database holding one or a plurality of service execution files, in which each of plural pieces of three-dimensional space region information related to the identifier in the first database and service information provided in each three-dimensional space region are related to each other.

(24) The present invention still further provides a service providing method for providing a service to a user terminal using a server system comprising the steps of storing, in the server system, a plural kinds of data in which each of plural pieces of three-dimensional real space range information and identification information corresponding to the three-dimensional real space region information are related to each other, and at least one service execution file in which region information related to the identification information and service information related to each region information is related to each other, extracting identification information corresponding to three-dimensional real space region information including a position represented by position information on the user terminal, specifying a service execution file corresponding to the region information, and performing an executing process of a service corresponding to service information held in the specified service execution file for the user terminal.

According to this invention, it is possible to cope with an increase in service information by grasping a directory as boundary information defining a region in which a service is available, and controlling the boundary information. With the boundary information, it is possible to transfer information in the boundary to client, whereby the client can retrieve a service by himself/herself.

BRIEF DESCRIPTION OF THE DRAWINGS

FIG. 6 is a diagram for illustrating the balloon data according to the first embodiment of this invention;

FIG. 17A is a diagram showing an example of a directory having a boundary according to the first embodiment of this invention;

FIG. 17B is a diagram showing an example of the directory having a ambiguous boundary according to the first embodiment of this invention;

FIG. 20A is a diagram for illustrating service offer using information density according to the first embodiment of this invention;

FIG. 20B is a diagram for illustrating service offer of different menus according to the embodiment of this invention;

FIG. 22 is a diagram for illustrating a method of changing a region range according to the first embodiment of this invention;

DESCRIPTION OF THE PREFERRED EMBODIMENTS

Hereinafter, description will be made of embodiments of the present invention with reference to the drawings.

(A) Description of First Embodiment of the Invention

Figure 1:
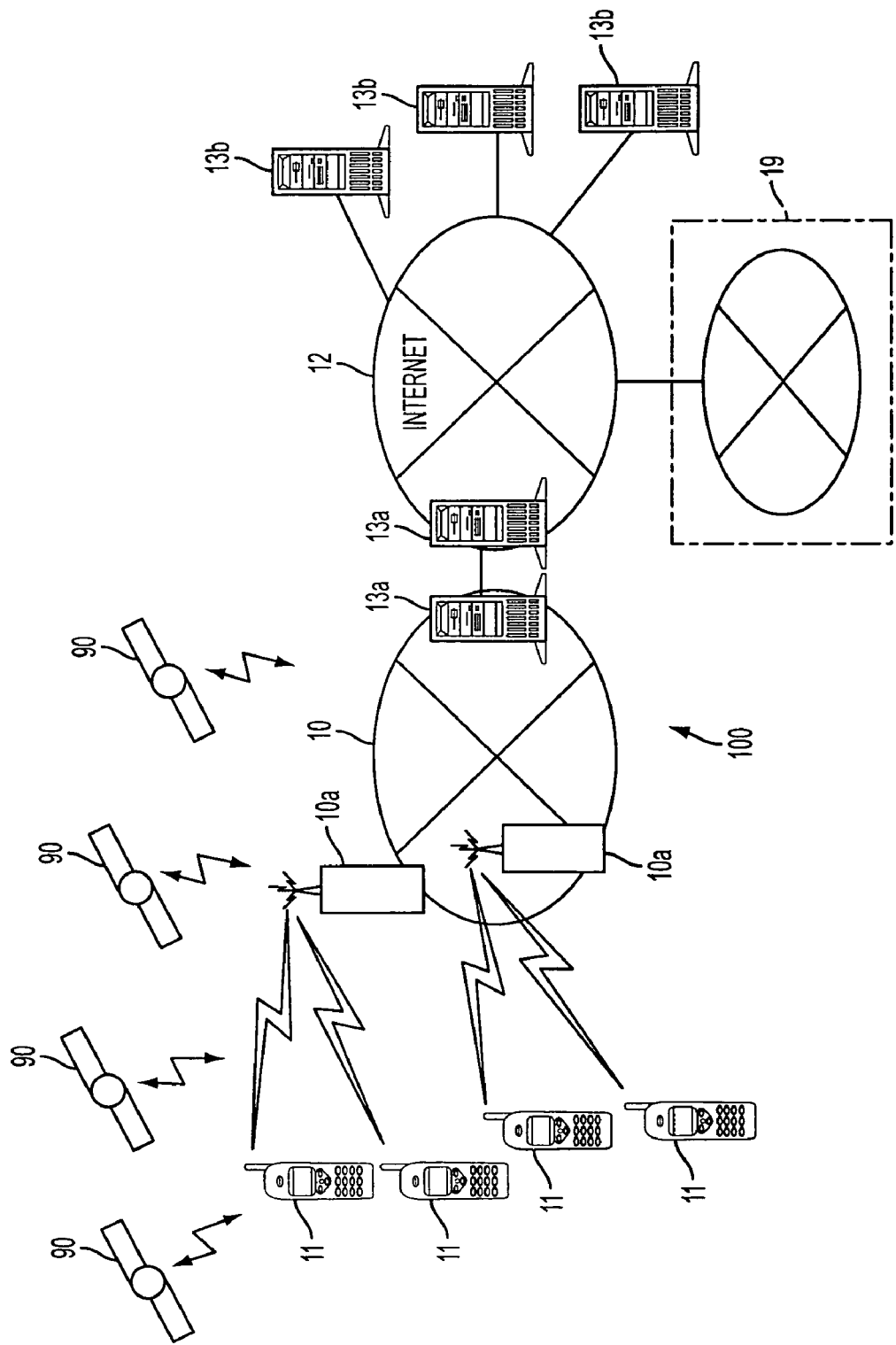
FIG. 1 is a diagram showing a structure of a service providing system according to a first embodiment of this invention.

FIG. 1 is a diagram showing the structure of a service providing system (information delivery system) according to a first embodiment of this invention. The service providing system shown in FIG. 1 provides various kinds of services to a user terminal such as a portable terminal, a cellular phone, a PDA (Personal Digital Assistant) or the like, or using the user terminal. As examples of the services, there are (i) telephone, mail, internet connection, (ii) delivery of contents such as music, still pictures, moving pictures, etc., (iii) offer of time table information to a user terminal in a specific place such as a station or the like, (iv) advertisement of goods to a user terminal in a building such as a department store or the like, and (v) map display, geographical guidance, etc. In addition, (vi) transmitting mails of goods, services, advertisements and public information of stores and public organizations, or transmitting mails of delivery information or business information to specific users in the company, and so forth.

In addition to these services, the service providing system 100 provides information such as a menu of a restaurant in a department store, to which the user terminal is pointed, to the user terminal equipped with a positioning module which can position a position (space position) in three-dimensional space having latitude, longitude, altitude and the like.

The service providing system 100 shown in FIG. 1 comprises a number of portable terminals (user terminals of this invention) 11, a base station 10a communicating in radio with the portable terminal 11, a radio telephone line network 10 between the portable terminal 11 and the base station 10a, the Internet 12 to which a number of Web servers (Web sites) having home pages and the like are connected, a gateway server 13a having a function of filtering data between the radio telephone line network 10 and the Internet 12, for example, and a service center (server system of this invention) connected to the Internet 12 to provide various kinds of information and services. The service providing system 100 provides various kinds of services using, for example, four GPS satellites 90.

Among them, the portable terminal 11 and the service center 19 will be now described in detail.

Figure 2:
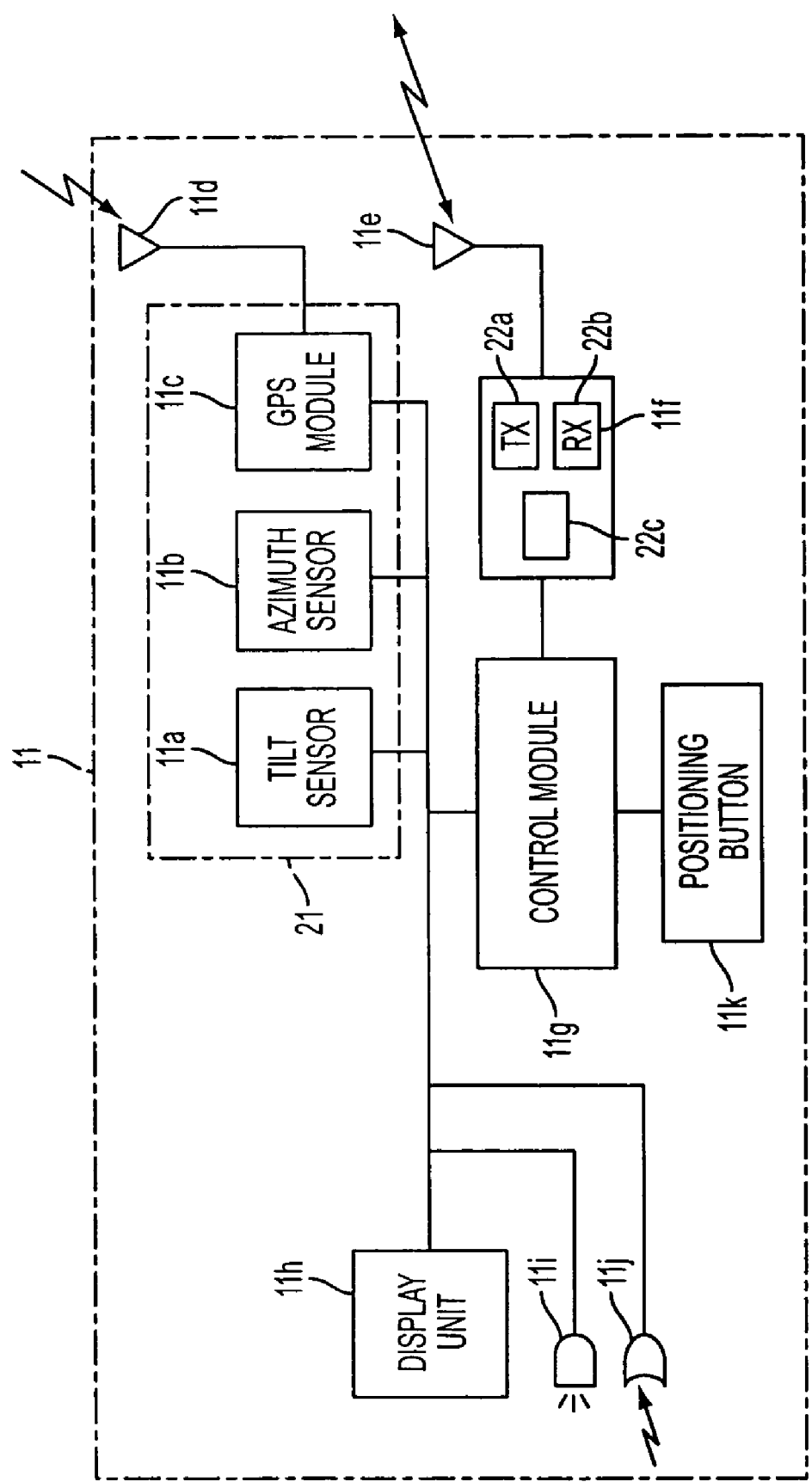
FIG. 2 is block diagram of a portable terminal according to the first embodiment of this invention.

FIG. 2 is a block diagram of the portable terminal 11 according to a first embodiment of this invention. The portable terminal 11 shown in FIG. 2 receives information from the service providing system 100. The portable terminal 11 comprises a GPS antenna 11d for receiving radio signals from the GPS satellites 90, a position information obtaining unit 21 for obtaining position information on the portable terminal 11 itself, an antenna 11e for communicating in radio with the base station 10a (FIG. 1), a radio module 11f for modulating/demodulating radio signals, a control module 11g for converting position information data obtained by the position information obtaining unit 21 to a transmission format, and performing a control or the like on each part of the portable terminal 11, a display unit 11h for displaying information such as a service execution completion message, a service execution result, etc., for example, relating to the service received by the radio module 11f, a microphone 11j, and a speaker 11i.

The radio module 11f comprises a transmitting unit (first transmitting unit) 22a for transmitting position information detected by the position information obtaining unit 21 to the service providing system 100, and a receiving unit (first receiving unit) 22b for receiving information relating to a service executed by the service providing system 100 at the position information transmitted from the transmitting unit 22a. The information received by the user, that is, the information relating to a service executed by the service providing system 100, is obtained by retrieval in a database of the service center 19.

The position information obtaining unit 21 obtains position information comprised of latitude, longitude, altitude, azimuth and tilt angle, which comprises a tilt sensor 11a, a GPS module 11c and an azimuth sensor 11b. The tilt sensor 11a measures a tilt angle of the portable terminal 11 to the horizon. The GPS module 11c obtains latitude, longitude and altitude of the portable terminal 11 from radio signals containing discrimination IDs (Identifications) of the respective GPS satellites transmitted from the four GPS satellites and transmission times of the signals including the discrimination IDs. The azimuth sensor 11b measures the azimuth by detecting the earth magnetism.

Meanwhile, it is preferable to collect all five elements included in the position information. However, it is possible that a part of the elements are not used, but constants are substituted for the part of the elements. With respect to the service providing area according to the first embodiment, the elements such as latitude, longitude, altitude, etc. are obtained since the service providing area is as wide as a city, the whole area of Japan, or the like. On the contrary, a positioning method according to a second embodiment to be described later uses a triangulation method or the like in a relatively small room or floor, thus the method is performed without using latitude, longitude, altitude, etc.

In FIG. 1, the user selects, for example, a department store among buildings within his/her own sight, points the user terminal to the ninth floor of the department in order to obtain information on a menu, the degree of crowdedness and the like of a restaurant on the ninth floor, and presses down a positioning button 11k or the like of the portable terminal 11. By pressing the positioning button 11k, the position information obtaining unit 21 of the portable terminal 11 starts a position information obtaining operation. The control module 11g obtains the latitude, longitude and altitude of the portable terminal 11 from the GPS module 11c, obtains the azimuth of the portable terminal 11 from the azimuth sensor 11b, and obtains the tilt angle of the portable terminal 11 from the tilt sensor 11a. The control module 11g format-converts the data of the latitude, longitude, altitude, azimuth and tilt angle to position information data, and transmits the converted position information to the service center 19.

When receiving the position information, the service center 19 (FIG. 1) retrieves in a space information database to be described later, extracts a menu or the like beforehand entered by the restaurant, and transmits information on the menu, the degree of crowdedness and the like to the portable terminal 11.

The user can obtain service information without searching for an advertisement of the restaurant or the like, without directly inquiring of the restaurant, without accessing to a homepage or the like of the restaurant, and without retrieving the information over the Internet 12. In other words, the user can obtain the service information on the restaurant within his/her sight, with an analog-like feeling such as "this place" or "that place," instead of performing so-called a digital-like process such as Internet connection or the like.

The service center 19 includes a server system (server) holding plural kinds of balloon data (bubble data) in which each of plural pieces of three-dimensional real space range information occupation information (space range information or space region information) comprised of latitude, longitude, altitude and a balloon radius of an object in three-dimensional space (for example, a building, each floor of the building, an object actually existing such as a signboard or the like, or an object moving in the space) or a desired space, and an address (URL [Uniform Resource Locator]) related to each object are related to each other. Here, address (URL) functions as an identifier for identifying each piece of three-dimensional real space range information or an address for obtained service information. The server system can also hold balloon data in which space occupation information on a desired space, and each pieces of various kinds of information desired to be related to the desired space or an URL related to the information are related to each other.

The server system is of a distributed type, in which the server system has a plurality of servers, and a function of a mail server or a server relating to domain names, for example, is given to each server. Alternatively, it is possible to bring together a plurality of functions of the server system to one server.

Next, balloon will be described in detail.

"Balloon" is data held in the database. The above space occupation information is a specific space in three-dimensional space, handled like a bubble floating in three-dimensional space. A building in the real space is reproduced with a balloon. The shape of the balloon may be sphere, ellipsoid, quadrangular (rectangular parallelepiped) or the like meeting to the volume of a building. Hereinafter, description will be made by way of spherical balloons. By giving a spherical shape to the balloon, the database can specify the balloon with only data of the center coordinates (latitude, longitude altitude) and a radius (balloon radius), thus consumption of the quantity of the memory can be suppressed. The balloon can be set not only as a closed space (occupied space) but also a part of a predetermined range in the space or an infinite range on one side.

As a balloon data entering method, for example, a restaurant designates a position and a radius of a balloon, and makes an application for registration of the balloon to the service providing system 100. The service center 19 relates a balloon radius of 15 m (meter) and a URL of the restaurant, and writes them in a memory area in the database corresponding to a real space position of the ninth floor of the building. When the balloon data is written in the database, an image (information balloon) of the space occupation information on the bubble data is generated. When the bubble data is deleted from the database, the same effect as the information balloon vanishes is brought. The balloon may be set as a space obtained by dividing three-dimensional space. In the world of the database, balloons having various sizes are set in places where services or information is provided.

Figure 3:
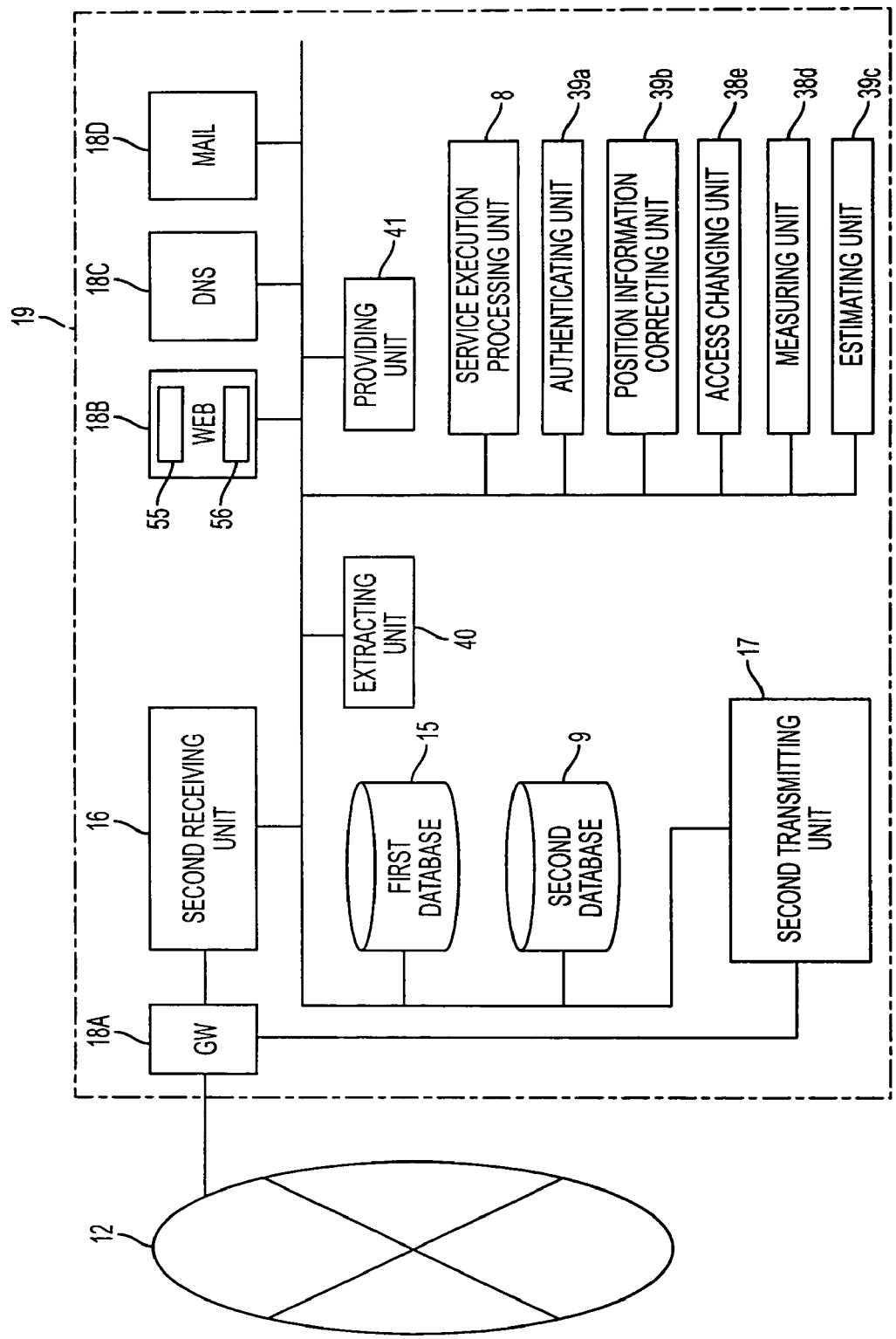
FIG. 3 is a diagram showing an example of a structure of a service center according to the first embodiment of this invention.

FIG. 3 is a diagram showing an example of the structure of the service center 19 according to the first embodiment of this invention. The service center 19 shown in FIG. 3 performs a process of executing services held in the second database to be described later on the basis of position information transmitted from the portable terminal 11. The service center 19 comprises a space information database (first database: space occupation information/URL database) 15, a second database 9, a service execution processing unit 8, a receiving unit (second receiving unit) 16, a transmitting unit (second transmitting unit) 17, an extracting unit 40, a providing unit 41, a gateway server (gateway unit: GW) 18a, a Web server (Web information outputting unit) 18b, a DNS (DomainName Server) server (DNS unit) 18c, and a mail server (mail transmitting/receiving unit) 18d. Incidentally, an authenticating unit 39a, a position information correcting unit 39b, an access changing unit 39c, a measuring unit 39d and an estimating unit 39e will be described later.

The space information database 15 holds balloon data in which space occupation information comprised of the latitude, longitude, altitude and balloon radius of an object in three-dimensional space, and a URL for obtaining various information relating to the object or service information relating the various information are related to each other.

The various kinds of information relating to the object are facilities information relating to the building. For example, this is information on buildings, Tokyo Tower, stores in these buildings, stations of public transportation facilities, etc. The service information relating to the various kinds of information is service information on the facilities information. For example, this is information on products of a company, opening time of Tokyo Tower, a menu or the like of a restaurant or eating place in a building, time table of a station, etc. In the following description, the same definition is applied unless not specifically mentioned. The space information database 15 is not always required to be installed in the service center 19, but may be held in a server in another place connected to the Internet 12.

The second database 9 holds one or plural service execution files in which each of plural pieces of three-dimensional space region information related to a URL (address) of the space information database linked to a three-dimensional real space region, service information provided in each three-dimensional space region, and a directory having one or plural hierarchical structures are related to one another. An example of the service execution is turning OFF the power of a TV set in one's home from inside a car in a place far way from the home, starting recording of a video, or heating the bath from the outside, for example.

The extracting unit 40 extracts a service execution file corresponding to a three-dimensional space region related to an identifier among one or plural service execution files in the second database 9 on the basis of position information on the portable terminal 11 and a URL held in the space information database 15. The extracting unit 40 extracts a service execution file or a directory corresponding to a three-dimensional space region relating to the URL among one or plural directories. In the first embodiment, the service center 19 uses position information obtained by positioning position information on the portable terminal 11 by the portable terminal 11 itself and transmitting the information from the portable terminal 11.

The providing unit 41 provides service information corresponding to an address extracted by the extracting unit 40 to the portable terminal 11. The providing unit 41 also provides service information corresponding to retrieved information extracted by the extracting unit 40 to the portable terminal 11.

The gateway server 18a has a gateway function. The Web server 18b holds individuals, menus of restaurants, etc. The DNS server 18c has a conversion table of a host name and an IP address, and outputs an IP address corresponding to a received host name. The mail server 18d transmits/receives electronic mails.

Incidentally, the authenticating unit 39a, the position information correcting unit 39b, the access changing unit 39c, the measuring unit 39d and the estimating unit 39e will be described later.

The service execution processing unit 8 performs an executing process of a service corresponding to service information held in a service execution file or a service execution file in a directory extracted by the extracting unit 40.

The service execution processing unit 8 has a function of transmitting information relating to a service to be executed to the portable terminal 11. The information relating to a service to be executed signifies contents such as music, video or the like, or information showing that the control means of a TV set has been accessed and the power of the TV set has been turned OFF in a service of turning OFF the power of the TV set, for example.

The server system 21 has the authenticating unit 39a for authenticating the portable terminal 11 as to availability of a service, whereby the reliability of the service is improved. Further, the server system 21 has the position information correcting unit 39b which inputs corrected position information estimated or corrected on the basis of the position information on the portable terminal 11 as position information to the extracting unit 40, whereby the accuracy of the position information is further improved.

Next, description will be made, with reference to FIGS. 4 through 6, a method in which the service center 19 obtains desired service information on the basis of position information on the portable terminal 11 and provides the information to the user of the portable terminal 11.

Figure 4:
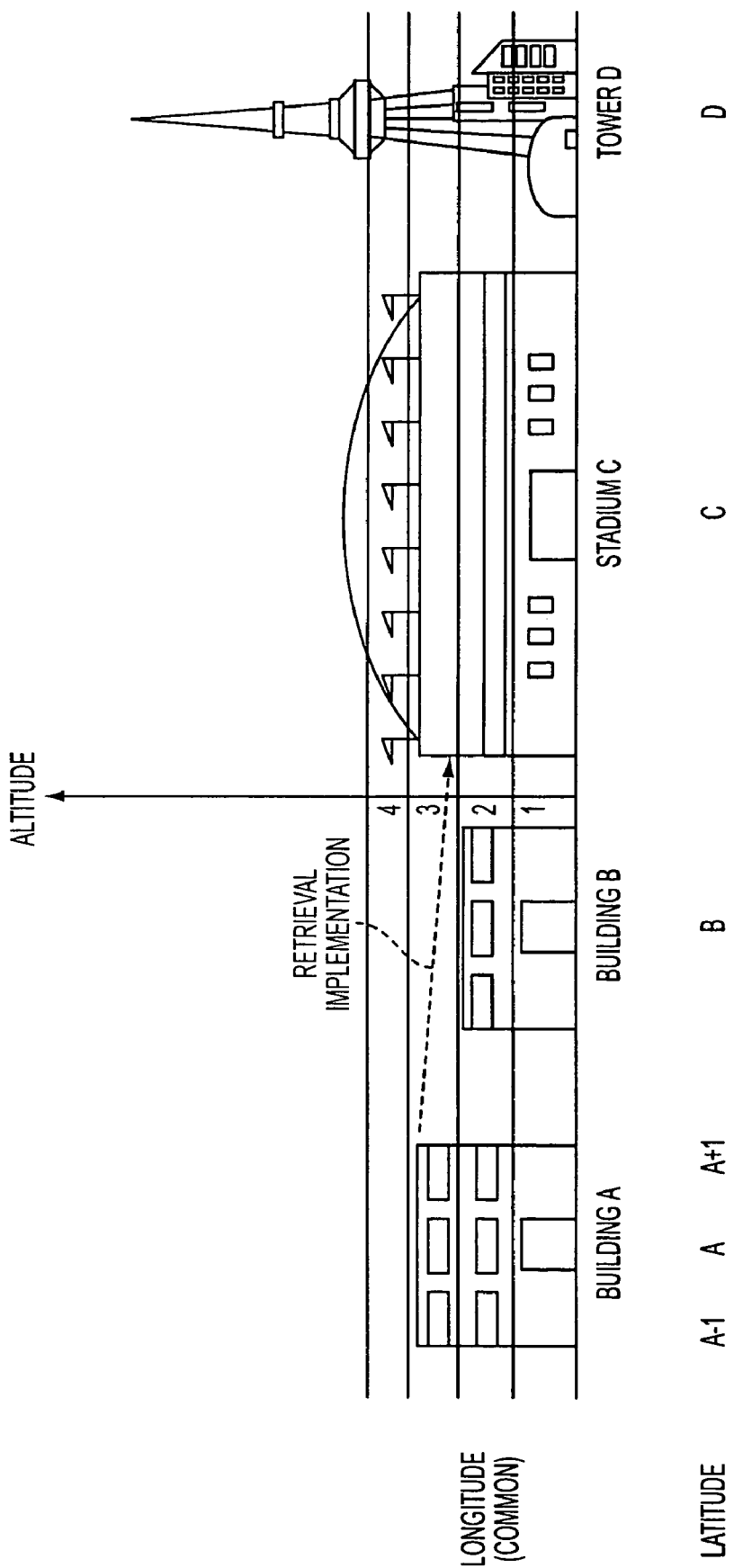
FIG. 4 is a diagram schematically showing an arrangement of buildings in a space.

FIG. 4 is a diagram schematically showing arrangement of buildings in a space. The positions of four buildings in FIG. 4 are at the same longitude and different latitudes. For example, A building is located in a range from latitude A−1 to A+1. The center positions of B building, C stadium and D tower are at latitudes B, C and D. Incidentally, the units of the latitude and longitude are both expressed by "°(degree)," "'(minute)" and "''(second)."

Figure 5:
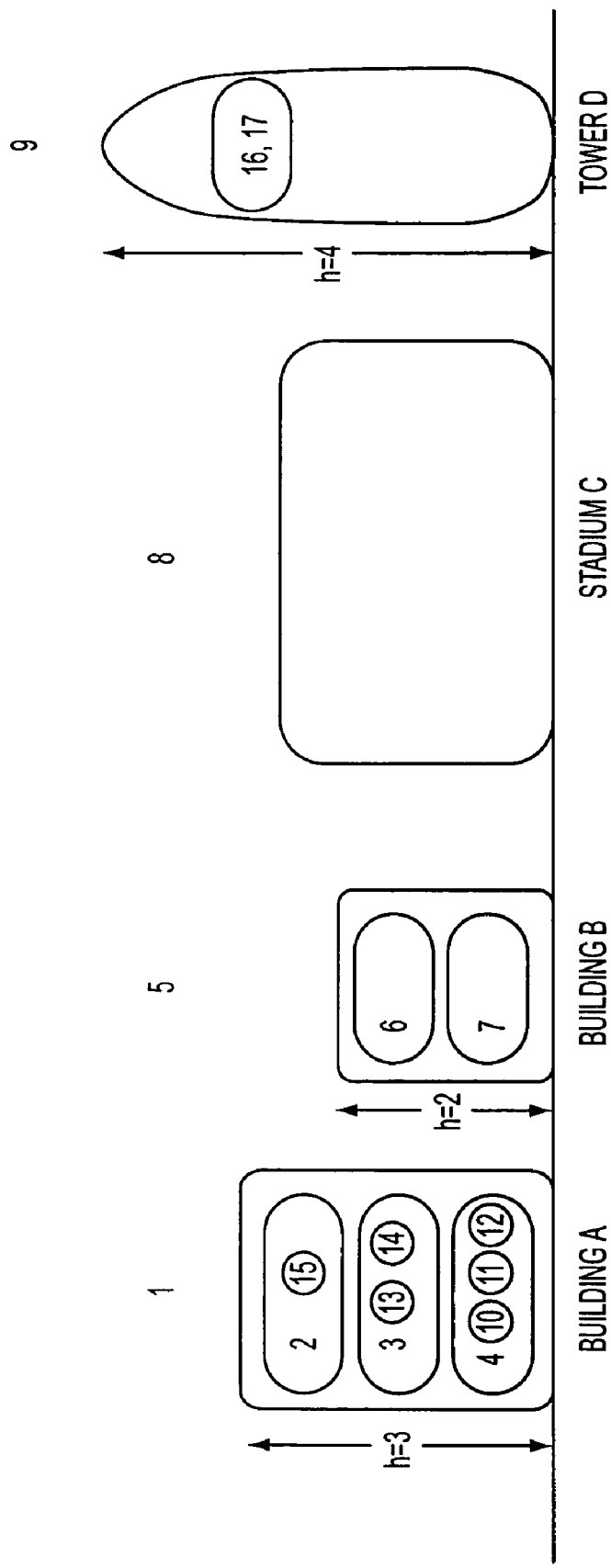
FIG. 5 is a diagram showing images of three-dimensional space ranges of balloon data according to the first embodiment of this invention.

FIG. 5 is a diagram showing images (information balloon) of three-dimensional space regions of balloon data according to the first embodiment of this invention. Information balloons 1 through 17 shown in FIG. 5 represent images corresponding to buildings A-D, respectively. In each of the information balloons 1 through 17, three-dimensional space range information comprised of the latitude, longitude, altitude and balloon radius of an object, and information on goods or a service provided in each building are related to each other.

The information balloons 1, 5 8 and 9 represent A building, B building, C stadium and D tower, respectively. The information balloon 1 has information balloons 2, 3 and 4 inside thereof. The information balloons 2, 3 and 4 represent images of respective floors in A building.

To obtain these information balloons, the portable terminal 11 transmits, to the service center 19, an actually measured position obtained by converting a measured position actually positioned into data. When receiving the actually measured position, the data center 19 retrieves a service to be provided in a three-dimensional space range including the actually measured position of the portable terminal 11 in balloon data held in the space information database 15. The service center 19 transmits the service obtained by the retrieval to the portable terminal 11.

FIG. 6 is a diagram for illustrating balloon data according to the first embodiment of this invention. Balloon numbers 1 to 17 shown in FIG. 6 represent the balloon numbers 1 to 17 shown in FIG. 5, respectively. Data denoted by A/X/0/3 represents latitude, longitude, altitude and balloon radius. For example, the balloon number 2 corresponds to the third floor of A building shown in FIG. 5. The service center 19 converts this data into latitude A (unit: degree), longitude X (unit: degree), altitude 3 (corresponding to 45 m) and a balloon radius 1, and holds them. Incidentally, an altitude 0 represents that the building contacts with the ground, altitudes 1, 2 and 3 represent values corresponding to true values (for example, 15 m, 30 m and 45m). Balloon radii 0.5 to 4 are values corresponding to true values (for example, 1 m to 8 m).

The URL also functions as a service ID for identifying each of a number of services held in the second database 9. For example, URLs are used to discriminate a case where logical balloons of documents or the like inputted to the second database 9 are offered as services from a case where device balloons of devices outputted from the second database 9 are offered as services.

Whereby, it is possible to easily retrieve delivery contents or the like. In other words, Web sites displaying service information relating to objects are held in relation with URLs.

The space region occupation information is used to change the space regions occupied by a plurality of balloons, which will be described later with reference to FIG. 16.

Additionally, there is set an operation to be performed when a balloon is caught by the user. As an example of this setting, five attributes described in (i) to (v) below are given to each balloon. (i) Generation of a copy of a balloon caught by the user is allowed, but movement of the position of the balloon is not allowed. (ii) Movement of a balloon caught by the user is allowed, but generation of a copy of the balloon is not allowed. (iii) Movement and copy of a balloon that the user intends to catch are both not allowed. (iv) Movement and copy of a balloon are allowed depending on how the user caught the balloon. (v) Movement and copy of a balloon set in a directory in the highest hierarchy (hereinafter referred to as a comprehensive balloon) are both not allowed. Approach to directories in the lower hierarchy and access to balloons in the approached directories are allowed.

By giving the attributes to balloons, a balloon processing similar to file and directory operations in UNIX or the like becomes possible, which improves the operability of files and the like. Owing to interfaces with balloons, it is possible to catch information mapped in the real space.

When the portable terminal 11 transmits position information to the service center 19, the extracting unit 40 of the service center 19 retrieves in the space information database 15, and notifies the portable terminal 11 of an URL of the restaurant. Whereby, the user can obtain a menu of food such as spaghetti and the like, business hours of the restaurant within a range of a balloon having a radius of 15 m.

Next, the space information providing service will be described with reference to FIGS. 7 and 8A through 8C.

Figure 7:
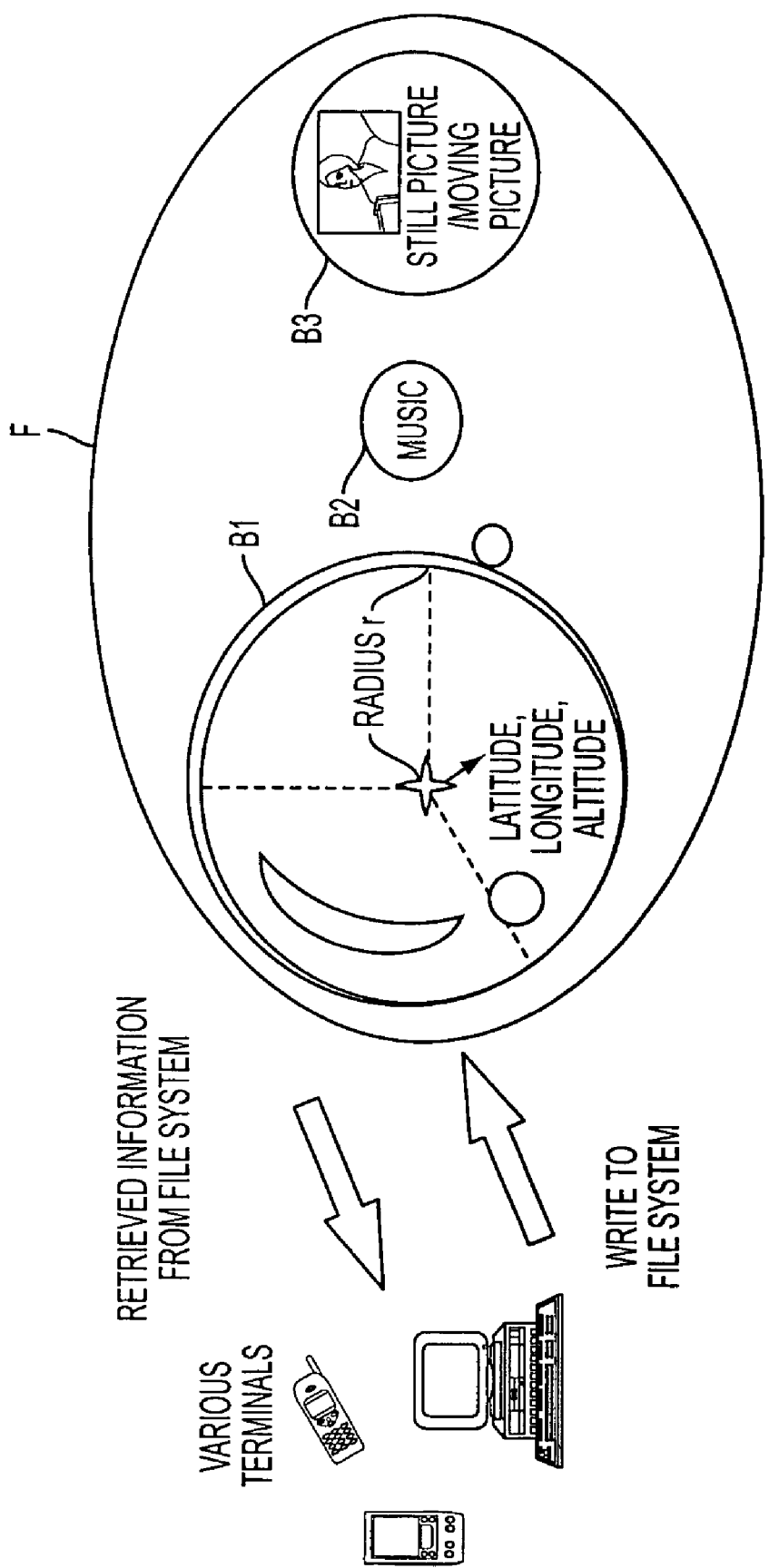
FIG. 7 is a diagram for illustrating a space information providing service according to the first embodiment of this invention.

FIG. 7 is a diagram for illustrating the space information providing service according to the first embodiment of this invention. A region (space occupation region) shown in FIG. 7 is the highest layer of the file system (function relating to handling of files among functions of OS [Operation System]). Regions denoted by B1 to B3 inside the region F correspond to lower directories of the region F. B1 is a balloon of geography, areas or the like. B2 and B3 are balloons of music, pictures and the like. In the lower directory of the balloon B2, balloons of different kinds of music such as European music, Japanese music, etc. are held. In the lower directory of the balloon B3, various kinds of pictures such as landscape, videos, etc. are held. The user can copy or move a part of the balloons B1 to B3.

Accordingly, the user who wants registration writes in the space information database 15 from the portable terminal 11, whereby a number of balloons are generated. When the user accesses to the space information database 15 to obtain a desired balloon, the user accesses to the space information database 15 using the portable terminal 11, retrieves various kinds of information in the space information database 15, and captures the retrieved data.

Figure 8B:
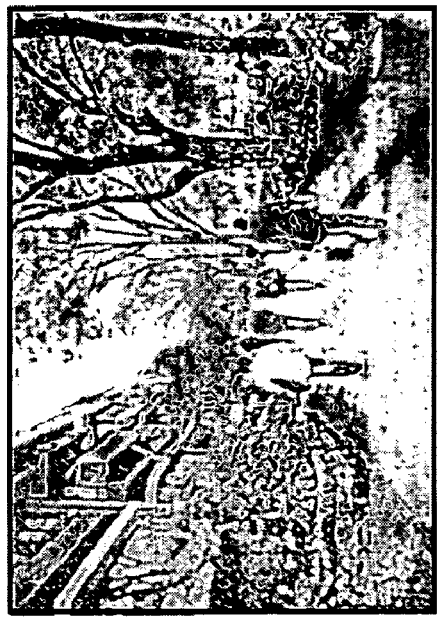
FIGS. 8A through 8C are diagrams for illustrating a relationship between a virtual space and a three-dimensional real space according to the first embodiment of this invention.
Figure 8C:
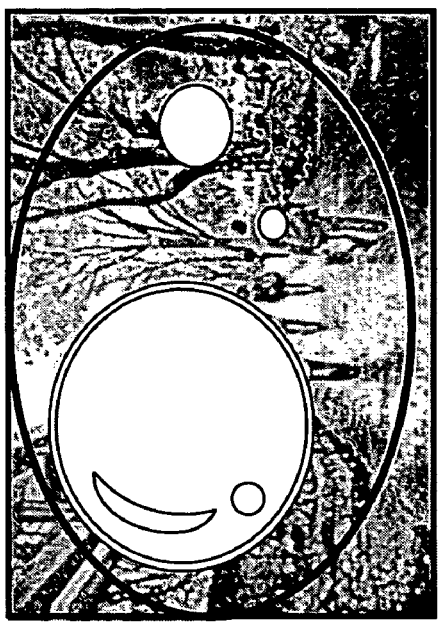
Figure 8A:
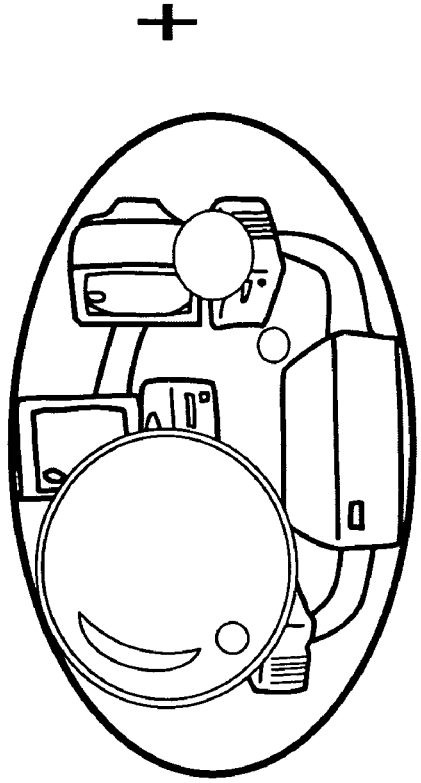

FIGS. 8A through 8C are diagrams for illustrating a relationship between a virtual space and a three-dimensional real space according to the first embodiment of this invention. An image shown in FIG. 8A represents a space constructed on a database in a virtual space without substances. On the other hand, an image shown in FIG. 8B represents a three-dimensional real space. An image shown in FIG. 8C represents a space obtained by adding the images in FIGS. 8A and 8B to each other, which corresponds to a ubiquitous space in which services are provided.

One of features of the ubiquitous space is that the ubiquitous space has discontinuity. "Discontinuity" signifies that the number and kinds of the information providing services is coarse or dense depending on a place. Generally, the number and kinds of the services is small in suburbs and mountainous regions, whereas the number and kinds of the services is large in city areas. Accordingly, places in which services are provided concentrate in places in which public facilities such as school, stations, highways, commercial facilities and the like are located. For example, in a place away from a city area in which many services are provided, the number of provided services decreases. In a place closer to another city area, the number of provided services increases.

The user recognizes a ubiquitous space as a directory, and recognizes services and information provided in the directory as files, whereby a virtual space information database 15 developed in the real space can be constructed. By using the space information service, it becomes possible to control information linked to real spaces.

Even when the balloon B and the user do not contact with each other in the real space, there is a case where the balloon B and the user overlap on each other in the world of the space information database 15. In such case, the service center 19 extracts a service provided in the overlapping balloon.

In the space information database 15, intuitive operations or operation based on analog-like feeling such as "contacting with a balloon," "catching a balloon" and "moving a balloon" in the real space become possible. Additionally, it becomes possible to easily use office equipment, home appliances and the like requiring complicated operations, by operating balloons in the virtual spaces.

Next, description will be made of the second database 9 and terms or the like necessary in the following explanation, in detail.

Generally, files are a mechanism for abstraction, and are managed by an OS (Operation System). Directory is a file for managing files, and manages the number, size, name, attribute (accessibility, read only/writable, etc.), pointer and so forth of each file in the directory. The file structure, directory structure, accessibility to files, and so forth are determined according to the specification of the OS. A function relating to handling of files among functions of the OS is called a file system. Since the second database 9 is constructed with UNIX, the specification relating to file management of UNIX can be used.

In other words, file system is a method or scheme of managing files and directories operated by the user. Owing to the file system, a number of file data held in a storage are managed.

In concrete, attributes (file attribute in broad sense) of files such as file structure (how many bites are used to make one file), accessibility to file (readable, writable or the like), property of file (file attribute in narrow sense: name, creator, time of creation, size, etc.), type of file (normal file, directory, file which manages information contained in another file, special file handling input/output hardware as a file, etc.), file operation (UNIX commands), and so forth are possessed in common by the space information database 15 and the second database 9.

This file system gives file attributes similar to those of UNIX file system to each pieces of information when information data is held in the space information database 15. Namely, this file system gives file attributes to services. In this sense, "space information" is information defined in a virtual space linked to a three-dimensional real space, and can be said to be a file system which occupies (possesses in common) a space region in the virtual space, and generalizes information accessible through the three-dimensional real space as a space medium.

Accordingly, directory structure (tree structure) can be introduced into this file system like UNIX.

According to the service providing method of the first embodiment of this invention, the position information obtaining unit 21 obtains position information on the portable terminal 1, and the transmitting unit 22a transmits the position information detected by the position information obtaining unit 21 to the server system 21.

In the server system 21, the extracting unit extracts a service execution file corresponding to a three-dimensional space region at the position information transmitted from the portable terminal 11 on the basis of the space information database 15 and the second database 9. The service execution processing unit 8 performs an execution process of a service corresponding to service information held in the service execution file extracted by the extracting unit.

The server system 21 constructs a file system abstracting and representing a real space in a virtual space linked to the real space. Accordingly, the service providing system 100 designates a service related to position information, using abstracted position information. Here, "abstraction" signifies directory structure.

In the following explanation, "real space" signifies (i) natural substance such as room, building, mountain, river, island or the like, (ii) nation or area such as Japan, Tokyo or the like, and (iii) service of, for example, "turning ON/OFF the power of a TV set in one's room" from a remote place, as will be described later.

With respect to the above (i) and (ii), "file system abstracting a real space" is a file management system constructed by hierarchically creating directories or files named "building," "mountain" and the like in relation to substances existing in real spaces such as building, mounting and the like in a database.

With respect to (iii) "file system abstracting a real space" is a file management system handling a specific service of, for example, "turning ON/OFF the power of a TV set in one's room" as a file having a specific real space region. In other words, the file management system in (iii) gives a directory or file having a hierarchical structure to even a service of "turning ON/OFF the power of a TV set in one's room" which is generally handled as an incorporeal object, as an object for abstraction, and handles it in the same rank as a directory or file obtained by abstracting a real space such as building, mountain or the like.

With respect to area names, a region of "Kanagawa Prefecture" or the like including areas such as "Yokohama City", "Kawasaki City" and the like occupied by one or more files is defined as a higher directory, and areas such as "Nishi Ward,"

"Kohoku Ward," "Miyamae Ward" and the like are defined as lower directories of "Yokohama City" and "Kawasaki City."

The directory can include not only files but another directory. In short, a system having a tree structure like a file system generally used in UNIX or the like is constructed (equivalent) with region information on real spaces.

When making a directory of an area such as "Yokohama City" or the like, the file system creates a definition file in order to record information included in "Yokohama City" directory. In the definition file, service information and information relating to the service information are recorded, and are used to form a database as information (file information in the directory) about each file present in the directory.

Figure 9:
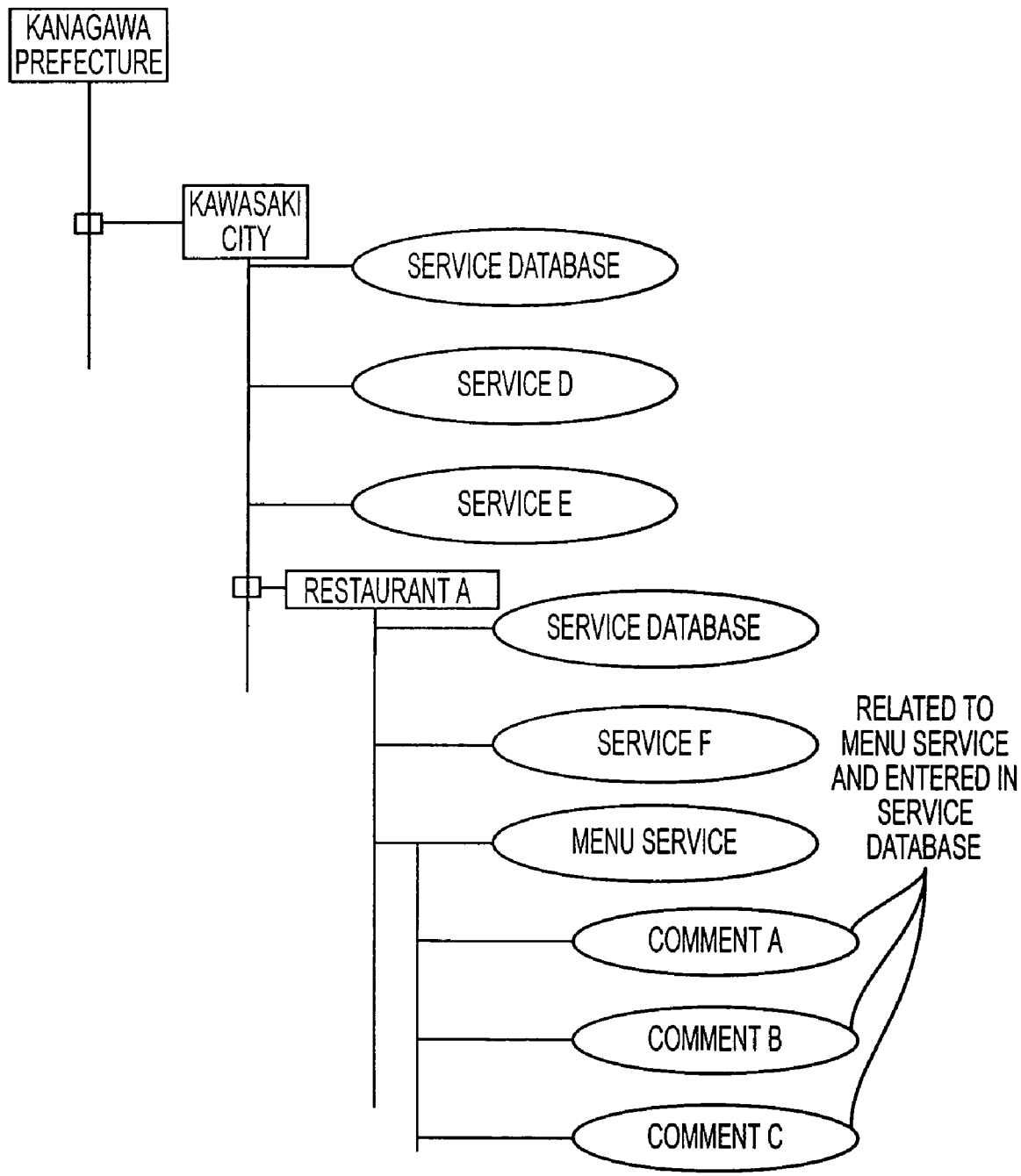
FIG. 9 is a diagram for illustrating a mapping concept according to the first embodiment of this invention.

FIG. 9 is a diagram showing an example of the definition file according to the first embodiment of this invention. In "restaurant A" directory shown in FIG. 9, one denoted as "service database" is a definition file. "Menu service" file and data (comments A through C) of comments on the menu correspond to service information and information relating to the service information, respectively. Accordingly, the second database 9 relates two files to each other so that each directory is related to one or plural subdirectories in the lower hierarchy than the directory.

Figure 10:
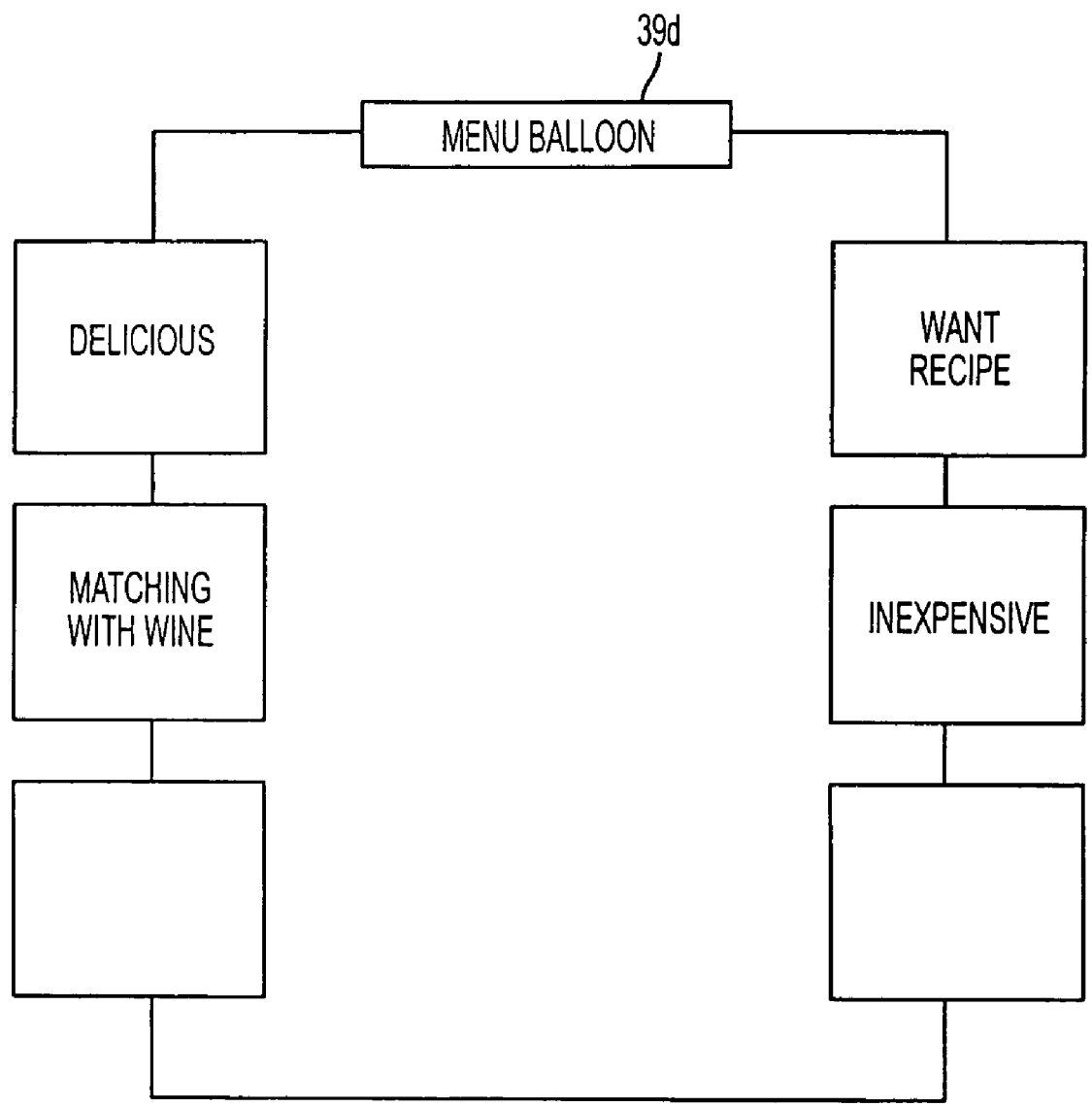
FIG. 10 is a diagram showing an example of a definition file according to the first embodiment of this invention.

FIG. 10 is a diagram showing another example of the definition file according to the first embodiment of this invention. In the definition file (menu balloon) shown in FIG. 10, plural pieces of independent information not depending on to one another such as "delicious," "want recipe," "matching with wine," "inexpensive" and the like flock to the definition file. The files are arranged so that different pieces of information or different services are related to one another in the space. Since another user refers to the definition file each time the user accesses to the directory, the user can obtain the latest and detailed information therefrom like the bulletin board on the Internet, for example.

Since the second database 9 sets relationship among plural pieces of service information, it is possible to prevent the information from exceeding the information processing performances of various servers installed in the service center 19, and to effectively use the memory holding the service information and the like.

This definition file will be further described in detail.

When the service center 19 accesses to a desired directory, the service center 19 first determines whether a service entered in each balloon is executable or not on the basis of balloon information in the database of file information in the directory, enters only an executable service in balloon information (internal value in the system) in the area, thereby to create a definition file defining information included in abstracted information, annexing the abstracted information. Each time another user accesses to the "Yokohama City" directory, the definition file is referred. Since the definition file records a list of all executable services present in the directory and listed service guidance or the like and updates them, the service providing system 100 can provide appropriate information to the users.

The definition file can also record attributes or the like of each file. When another user accesses to a desired directory, the user can obtain a number of pieces of file position information, subordinate information, attribute information and the like held in the directory and the lower directories.

It is possible to give a master-slave relationship (relative relationship) of service information in the abstracted directory as another function. The server system 21 has a relative relationship defining unit (not shown) for defining a relative relationship of each piece of service information in a plurality of directory layers held in the second database 9. This relative relationship can be defined as a master-slave relationship of service information in the abstracted layer, for example.

Figures 11A, 11B:
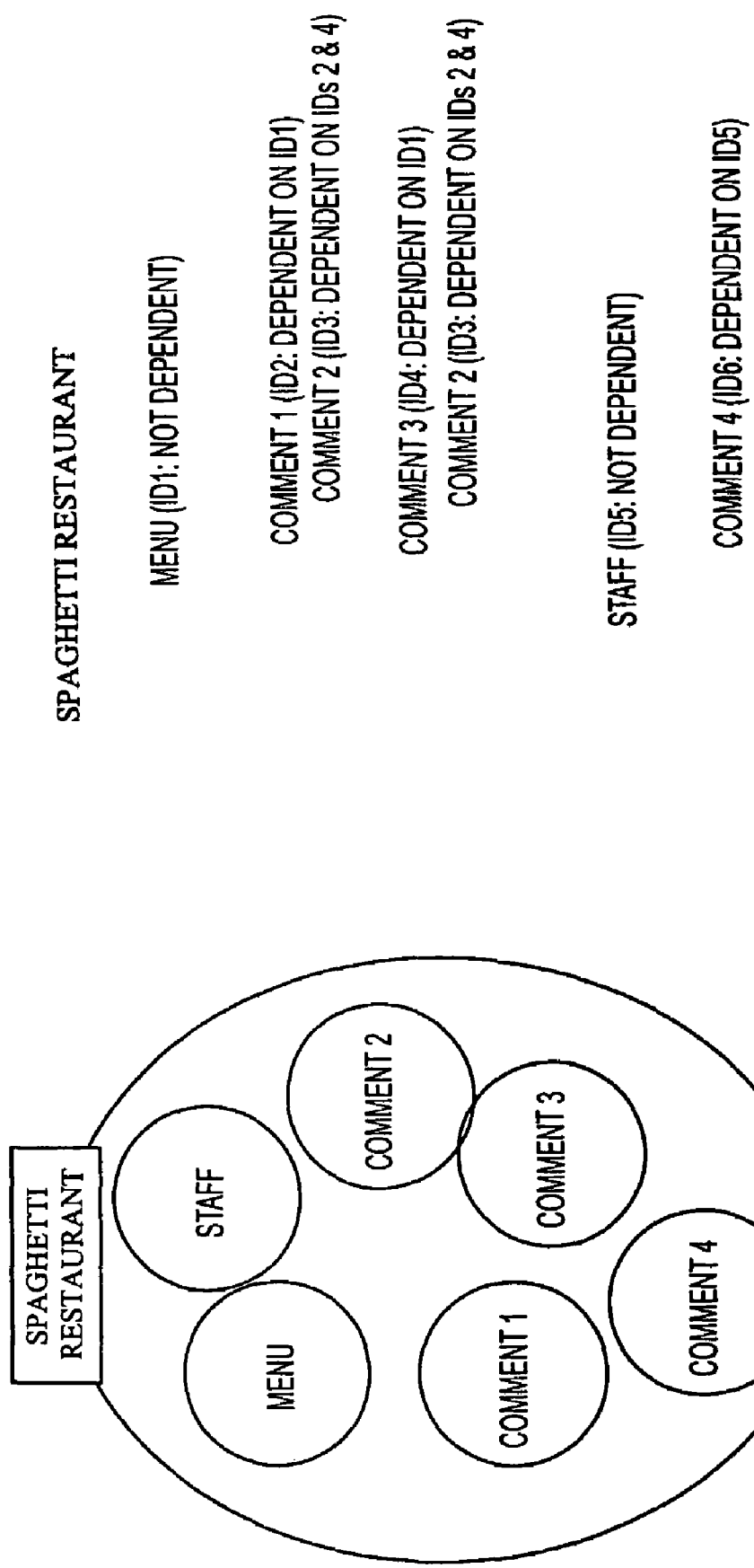
FIG. 11A is a diagram for illustrating an example of directory image according to the first embodiment of this invention.
FIG. 11B is a diagram showing the directory image in FIG. 11A with a directory structure.

FIG. 11A is a diagram for illustrating the master-slave relationship according to the first embodiment of this invention. "Spaghetti restaurant" balloon shown in FIG. 11A has files of "menu," "staff" and "comments 1 to 4", etc. The relative relationship defining unit gives different IDs 1 through 6 to the respective six files belonging to "spaghetti restaurant" directory shown in FIG. 11B, thereby to give information on a dependence relationship among the IDs 1 through 6 to the same. In concrete, the relative relationship defining unit gives the dependence relationship to each file such that the comment 1 (ID 2) depends on the menu (ID 1), the comment 2 (ID 3) depends on the comment 1 (ID 2) and the comment 3 (ID 4), and so forth.

Whereby, a state in which there is no dependence relationship among the files and a link of information lacks is changed to a state in which the dependence relationship among the files is clear.

Meanwhile, the dependence relationship can be defined as dependence on a file in another directory, or information on priority or the like of files.

Such definition of the directory structure is equivalent to abstraction of the area or region. Accordingly, it is possible to designate a service in a desired area, using a combination of abstracted layers. For example, when "turning ON the power of a TV set" service is used, the service can be expressed as "TV power ON service. Room311. FujitsuLaboratory. Kawasaki.Kanagawa.Japan." Namely, it is defined as "turning ON the power of the TV in room 311 in Fujitsu Laboratory in Kawasaki City, Kanagawa Prefecture, Japan." In other words, the second database 9 identifies a directory holding a service execution file, using a combination of names of a plurality of hierarchical directories, and designates and defines each file and directory.

It is possible to interpret the directory as boundary information defining a range in which a service can be used. By controlling the boundary information, it is possible to cope with an increase in service information. With the boundary information, it is possible to transfer information within the boundary information to a client to allow the client to retrieve services by himself/herself.

When the server system 21 accesses to the second database 9 and retrieves therein, it is possible to not only notify the portable terminal 11 of service information corresponding to position information on the portable terminal 11 but also retrieve in the space information database 15 and the second database 9 with a directory or file directly designated by the user as a tag for retrieval. By entering a number of directories to the database, the portable terminal 11 can obtain service information in a desired area. According to this service providing system 100, it is possible to obtain not only service information in the neighborhood of a position of the user terminal but also service information in a wider area.

Since information such as "in which area," "what service" and the like are defined, various types of information delivery services can be developed. Further, the second database 9 can use information limiting the number of accesses, in addition to information representing "accessed/not accessed."

It is also possible to add n-dimension (n representing a natural number) not less than three-dimension as filter for the region information. The n-dimension includes time information, profile information on a client, etc. By adding ambiguity of the boundary information to these pieces of information, it become possible to change the access density of the information in the above information delivery system operating in a certain dimension.

Next, a method of mapping the services in a three-dimensional real space will be described in detail.

The server system 21 constructs a file system linking to real spaces on a UNIX server, and holds files and directories representing plural pieces of three-dimensional space region information in a hard disk in the UNIX server and an external storage. The second database 9 holds plural pieces of three-dimensional space region information in any directory, using a general purpose OS such as UNIX, Windows (registered trademarks) or the like having a managing function of data, files and directories.

Figure 12:
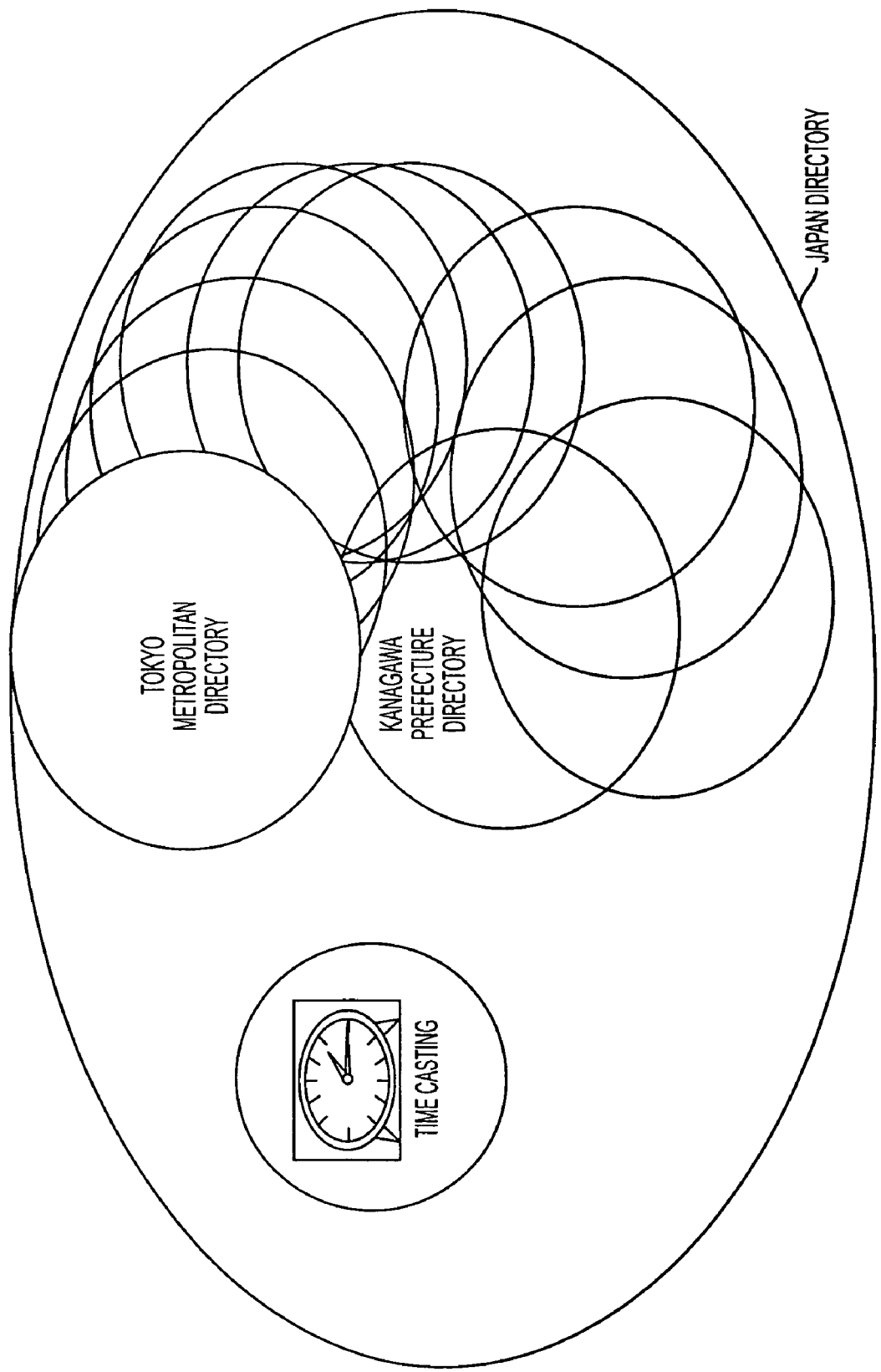
FIG. 12 is a diagram for illustrating the mapping concept according to the first embodiment of this invention.

FIG. 12 is a diagram for illustrating a mapping concept according to the first embodiment of this invention. A directory layer shown in FIG. 12 is given a name of "Japan" from the server system 21. "Japan" directory layer has, for example, "Tokyo Metropolitan" directory, "Kanagawa Prefecture" directory, "time casting" directory, etc. The user can reach a small balloon deep inside each directory. Each of "Tokyo Metropolitan" directory and "Kanagawa Prefecture" directory has files (service execution files) for performing the execution process of service that Tokyo Metropolitan or Kanagawa Prefecture can provide. An example of the service execution is that information on the time table of Kawasaki Station is notified to the users.

This service providing system 100 enters "notifying of time table information" service to the database as a service execution file, relates the service execution file to an area directory classified according to an area, and enters it. In this service providing system 100, the second database 9 assigns each region of a plurality of hierarchical directories on the basis of area regions in three-dimensional real space. It is also possible to generate each directory structure in the ubiquitous space.

In this file system, it is possible to designate a service related to position information, using abstracted, discontinuous position information. "Abstraction" signifies "constructing a hierarchical directory structure."

"Tokyo Metropolitan" directory or the like is linked to a specific area in the real space. Namely, the second database 9 assigns each region of a plurality of hierarchical directories on the basis of boundary information representing an area range in which a service can be provided. In other words, the server system 21 defines the concept of directory as a boundary of the ubiquitous space, and this service providing system 100 arranges services in the three-dimensional real space.

The second database 9 can set "time casting" directory representing "time broadcasting" service not relating to a specific area, for example. Namely, it is possible to create service information on services (weather information, mending service, time casting) and the like not relating to positions in a directory.

Accordingly, the second database 9 can hold information depending on three-dimensional space region information and information not depending on the same of each of the plural hierarchical directories with respect to one or plural service execution files, and can further hold service information not related to three-dimensional real space position information of each of plural hierarchical directories. Namely, the second database can include abstracted information in abstracted information.

Additionally, the second database 9 can hold together service information related to three-dimensional real space position information and service information not related to three-dimensional real space position information in each of plural hierarchical directories.

Figure 13:
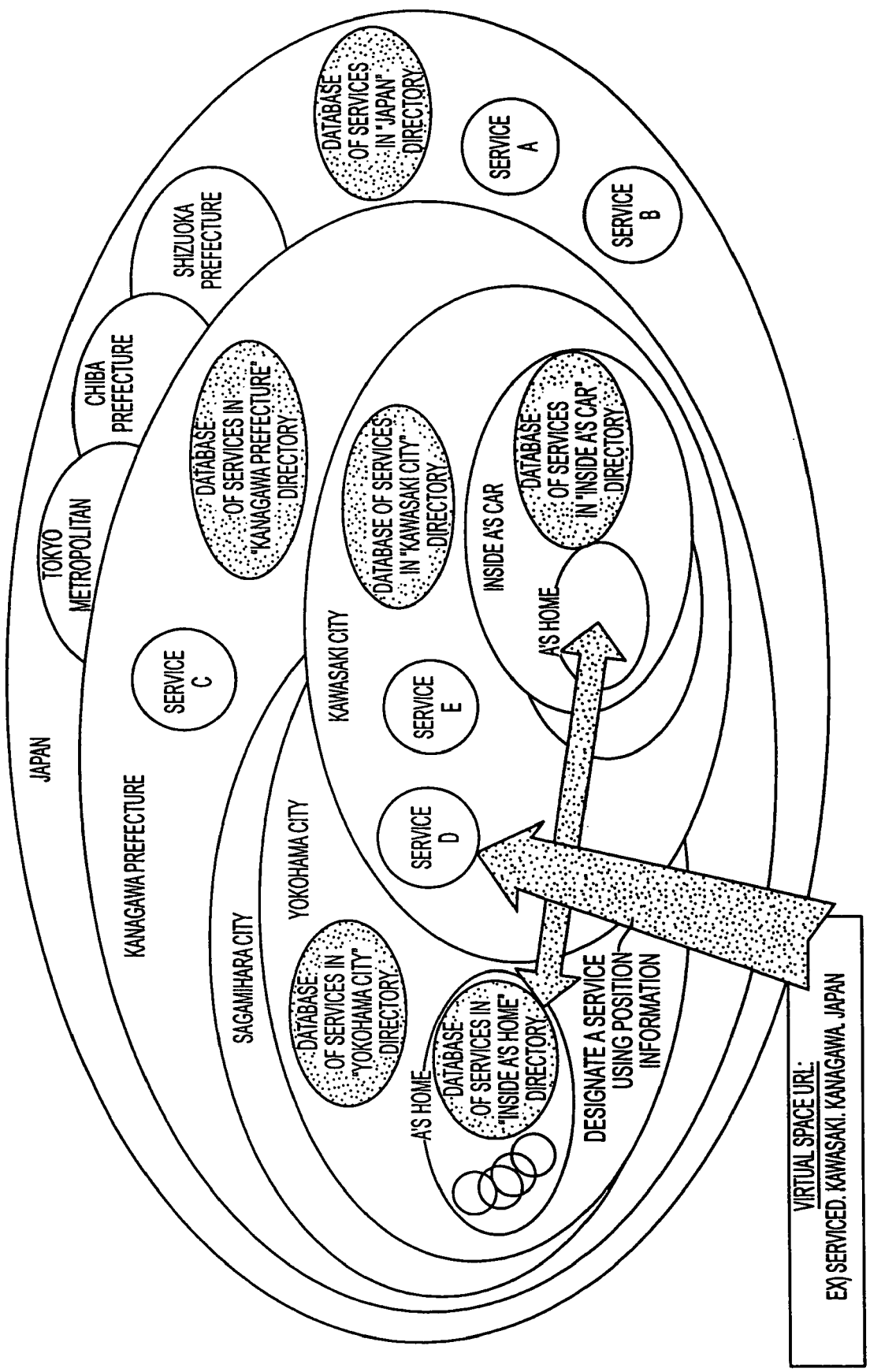
FIG. 13 is a diagram showing an example of a directory according to the first embodiment of this invention, illustrating a change in boundary shape according to the first embodiment of this invention.

FIG. 13 shows an example of a database of "Japan" directory. FIG. 13 is a diagram showing an example of a directory according to the first embodiment of this invention. Below "Japan" directory shown in FIG. 13 set are lower directories of specific areas such as Kanagawa Prefecture, Tokyo Metropolitan, etc., files of "service A," "service B," etc. representing services not depending on areas, and definition files recording files of all executable services present in "Japan" directory and listed service guidance. The second database 9 relates plural pieces of three-dimensional region information to any one of plural hierarchical directories, and holds them.

Each directory or file is given a URL (space URL). For example, a URL of a file having "service D" in "Kawasaki City" is represented as "serviceD.Kawasaki.Kanagawa.Japan." The second database 9 specifies a name of each of plural hierarchical directory layers on the basis of notation specification for files and directories in a general purpose OS such as UNIX or the like, using concatenation with period ".". Since other OSs such as Windows (registered trademark) and the like support concatenation with period ".", the second database 9 can be transplanted to a system using an OS other than UNIX.

As above, the second database 9 specifies a name of each of plural hierarchical directories on the basis of notation specification for files and directories of a general purpose OS.

A service is designated with position information, as above.

As an access path to an URL, position information such as latitude, longitude, altitude and the like of the portable terminal 11 is used. Accordingly, the portable terminal 11 accesses to a real space, and captures a service. On the other hand, the server system 21 designates a service, using a position "Kawasaki City."

Figure 14:
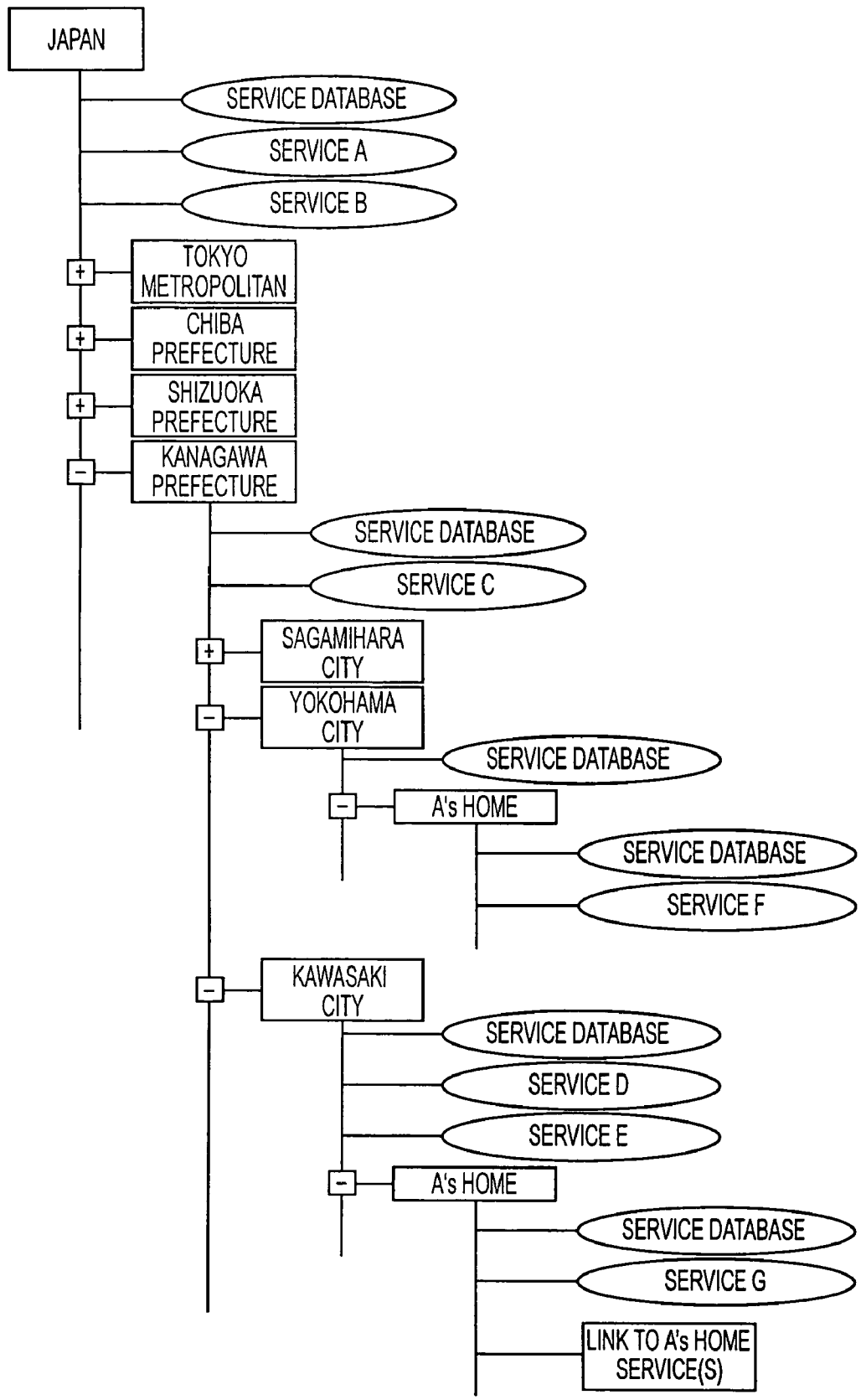
FIG. 14 is a diagram showing an example of the directory structure according to the first embodiment of this invention.

FIG. 14 is a diagram showing an example of the directory structure according to the first embodiment of this invention. Each of directory layers such as "Japan," "Kanagawa Prefecture," "Yokohama City," "Kawasaki City" and the like holds three kinds of directories and files: directory of specific area, service execution file and definition file. The second database 9 holds space information having a hierarchical structure like a hierarchical structure of UNIX, Windows (trade names) and the like. In a file system constructed in a virtual space, the directories are in a tree structure.

Attributes are given to each of files and directories held in the second database 9. It is necessary to protect privacy of files of the users because a plurality of users access to the files. For this, a protect code represented as rwxr-xr-x, for example, is given to each of files and directories like the file system of UNIX (trademark). Here, "r," "w" and "x" represent propriety of "read access," "write access" and "execute access," respectively. The first three bits "rwx" in the nine bits are given to the owner, the following three bits "r-x" are given to other user in a group of the owner, and the remaining three bits "r-x" are given to a user other than the above. As this, meanings of a protection code "rwxr-xr-x" is that the owner can read from, write in and execute the file, other user in the group can read from and execute the file, and a user other than the above can only execute the file. The second database 9 assigns a file attribute representing propriety of reading and writing to service information in one or plural service execution files, and holds plural pieces three-dimensional space region information.

This file system enables security management of each service, and various kinds of file operations such as linking of files or directories, copying of files, moving of files, and so forth. Additionally, this file system manages the above definition file as one type of file separately from normal files.

With respect to a directory of a specific area, it is possible to create a directory in a narrow range such as a specific place such as a residence or the like, a specific position of a car or the like. For example, "Kawasaki City" directory in Kanagawa Prefecture Area has a directory (inside A's car), and "Yokohama City" directory has a directory (A's house). By creating a directory of a house or the like, a service using remote control becomes possible as will be described next.

Figure 15B:
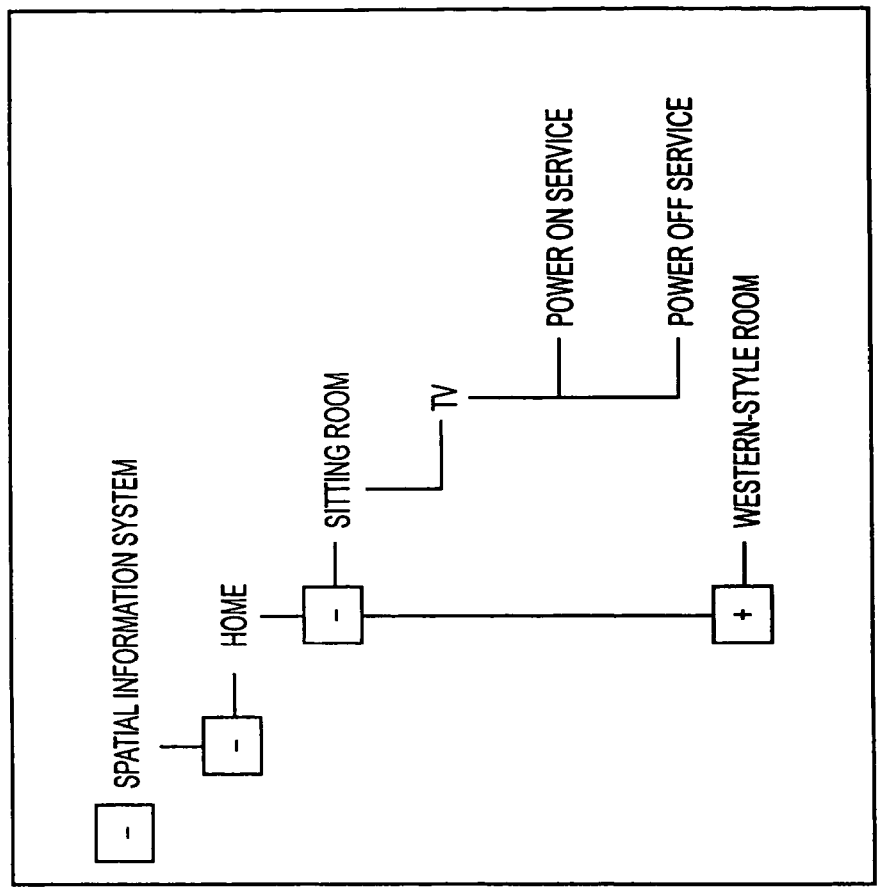
FIG. 15B is a diagram representing the directory image in FIG. 15A with the directory structure.
Figure 15A:
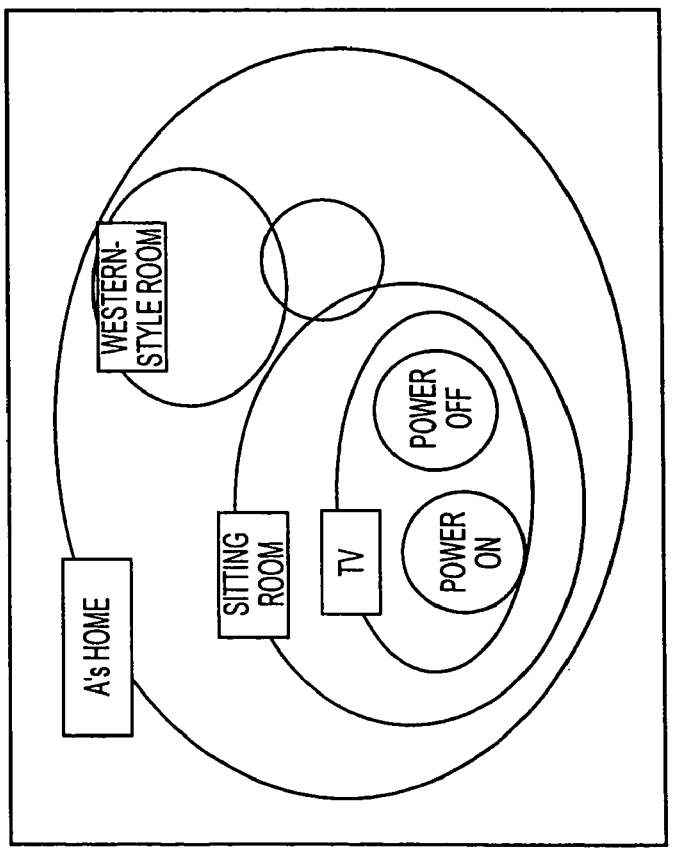
FIG. 15A is a diagram for illustrating another example of the directory image according to the first embodiment of this invention.

FIG. 15A is a diagram for illustrating another example of the directory image according to the first embodiment of this invention. A directory (A's house) shown in FIG. 15A has a deep hierarchy. A directory (TV) has directories (power ON) and (Power OFF). The user A beforehand enters this directory structure together with a balloon of "heating the bath" or the like. Here is further provided a remote control unit for notifying the portable terminal 11 of one or plural directory layers having a depth corresponding to a depth of the directory region of the portable terminal 11 among plural directories held in the second database 9.

FIG. 15B is a diagram showing the directory image in FIG. 15A displayed, using a directory structure. Next, a method of executing a service of turning OFF a TV set in one's room, using two kinds of directories will be described in detail.

When the user A accesses to the server system 21 from inside the car, using the portable terminal 11, the server system 21 links a directory (of A's home) to a directory (of inside A's car) corresponding to a file system in a personal computer inside the car, using "copy" which is a command of UNIX (trade mark) (incidentally, it is alternative possible to beforehand copy it). By copying it in UNIX (trademark), the position information is rewritten.

Following it, retrieval is performed in the second database 9 to extract a balloon 90. The balloon 90 starts execution of the service, and transmits a message signal of "turning OFF the power of TV) to an apparatus in A's home over, for example, a telephone line. When receiving the message signal, the apparatus turns OFF the power of the TV set, using a wire connected to the apparatus itself. The service execution processing unit 8 transmits information of "having turned OFF the power of TV" or the like to the user terminal in relation with the executed service ("turning OFF the power of TV), whereby the service execution is completed. As this, by associating the above information system with a file system held in the personal computer, remote control becomes possible.

This service system 29 not only merely assigns a region in the real space to a directory, but also realizes a service in a three-dimensional real space by executing a service execution file entered in the directory. In other words, the space information database 15 and the second database 9 both introduce a service in the real space into a virtual file.

Use of UNIX or the like improves the affinity for the computer in operation of directories or the like, and improves the operability of files, directories and the like representing service information.

Since the second database 9 is virtually constructed like the directory (inside A's car) and the directory (A's home), it is possible to make a small company look big, or enter nonexistent object in the real space to the second database 9.

As a first modification, it is possible to obtain information that cannot be received in only a specific place, or access to the Internet 12 through the space information service from the user, or transmit a mail to not only a person but also a specific place. Additionally, it is possible to access to a real space over the Internet 12.

As a second modification, a balloon of the service providing system 100 can approach the user. In contrast to a case where the user approaches a balloon to obtain service information, the shape of a boundary of an access region of information data held in the second database 9 is changed to change the number of accesses of the user.

Figure 16:
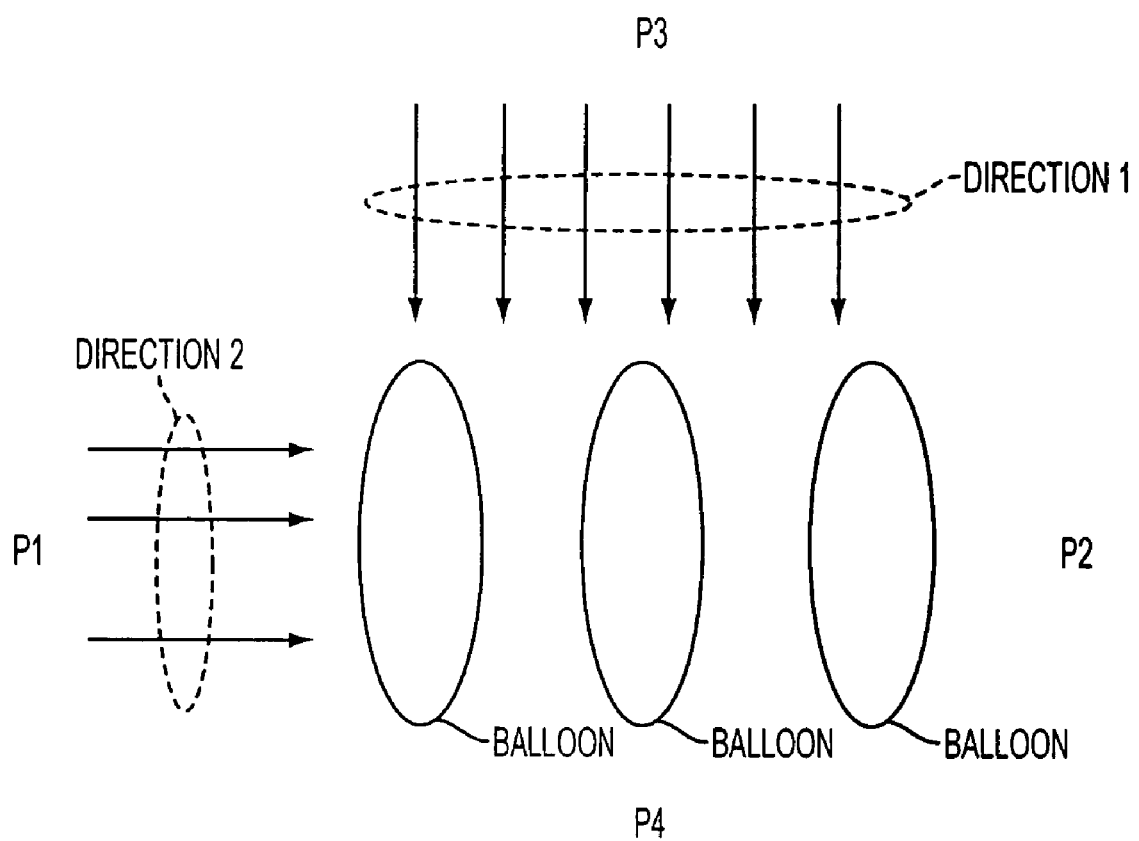
FIG. 16 is a diagram for illustrating a change in boundary shape according to the first embodiment of this invention.

FIG. 16 is a diagram for illustrating a change in boundary shape according to the first embodiment of this invention. Three balloons shown in FIG. 16 have ellipsoidal, long thin shapes, and are arranged on, for example, a road. When the user travels from P1 to P2, the user is apt to contact with the balloons. On the other hand, when the user travels from P3 to P4, the user is easy to pass through without contacting with the balloons.

The server system 21 has an access changing unit 39c (refer to FIG. 1) for giving space region occupation information (shape of boundary information) as an attribute of held balloons, and limiting accesses to a service execution file from the user on the basis of the space region occupation information. When constructing a layer and service of abstracted information in a virtual space linked to a real space, the server system 21 sets a desired shape to the shape of the access region of the information in the virtual space, thereby to control the degree of access to the information.

Accordingly, the second database 9 can sequentially change three-dimensional real space region information on balloon data on the basis of position information on the user terminal.

Since space region information (occupied region) occupied by a plurality of balloons and regions other than it can be changed on the basis of a position of the user terminal, the server system 21 can control the occasion that the balloon is caught by user's eyes.

The above directory structure is separately created for each of regions such as area, residence, car and the like. For, example, the server system 21 creates two balloons and directories for two cars neighboring in the real space. The outer peripheries are determined according to balloons having balloon radii of several meters around the cars A and B, respectively.

FIG. 17A is a diagram showing an example of a directory having boundaries according to the first embodiment of this invention. In the second database 9, data is such held that a boundary exists between "car A directory" and "car B directory" shown in FIG. 17A.

FIG. 17B is a diagram showing an example of directories having ambiguous boundaries according to the first embodiment of this invention. As will be stated later with reference to FIGS. 18 and 19, the server system 21 can creates directories in such a way that a boundary between two directories, "car A directory" and "car B directory," is ambiguous. The server system 21 enters a number of balloons while creating directories having ambiguous boundaries, thereby to collect the dense/coarse state of objects in the real space.

Hereinafter, a method of arranging balloons in a space will be described with reference to FIGS. 18 and 19.

When the user uses a service during a travel at a high speed in a car, train or the like, a range in the real space in which the user can use the service has a certain area. However, the faster the speed, the shorter is the period of time that the user stays within the service available area. For this, the user needs pre-setting to use the service. When the time required until the service is started is long, there is possibility that it is difficult for the user to stay within the service available area until the service is completed. If the server system 21 can previously detect that the user approaches the service available area, it is possible to beforehand execute a procedure necessary to use the service, and quickly prepare conditions or environments where the user can use the service when the user reaches the service available area.

The server system 21 creates approach detection balloons for detecting that the user approaches a destination (specific place such as a service available area or the like), and arranges the balloons in such a way that the farther from the destination, the more sparsely the balloons are arranged, whereas the closer to the destination, the more thickly the balloons are arranged. The server system 21 measures the number of times that the user contacts with the approach detection balloons while the user passes through a section (for example, railway track of the train, high way, etc.) in which the approach detection balloons are arranged. The server system 21 beforehand holds the degree of approach to a destination in a memory or the like according to the number of times of contact with balloons, and compares the held number of times of contact with the measured number of times of contact to determine "how much the user approaches the destination at present." Whereby, the server system 21 can know that the user gradually approaches the destination when the number of times of detection of the balloons arranged up to the destination along the direction of the travel increases.

Figure 18:
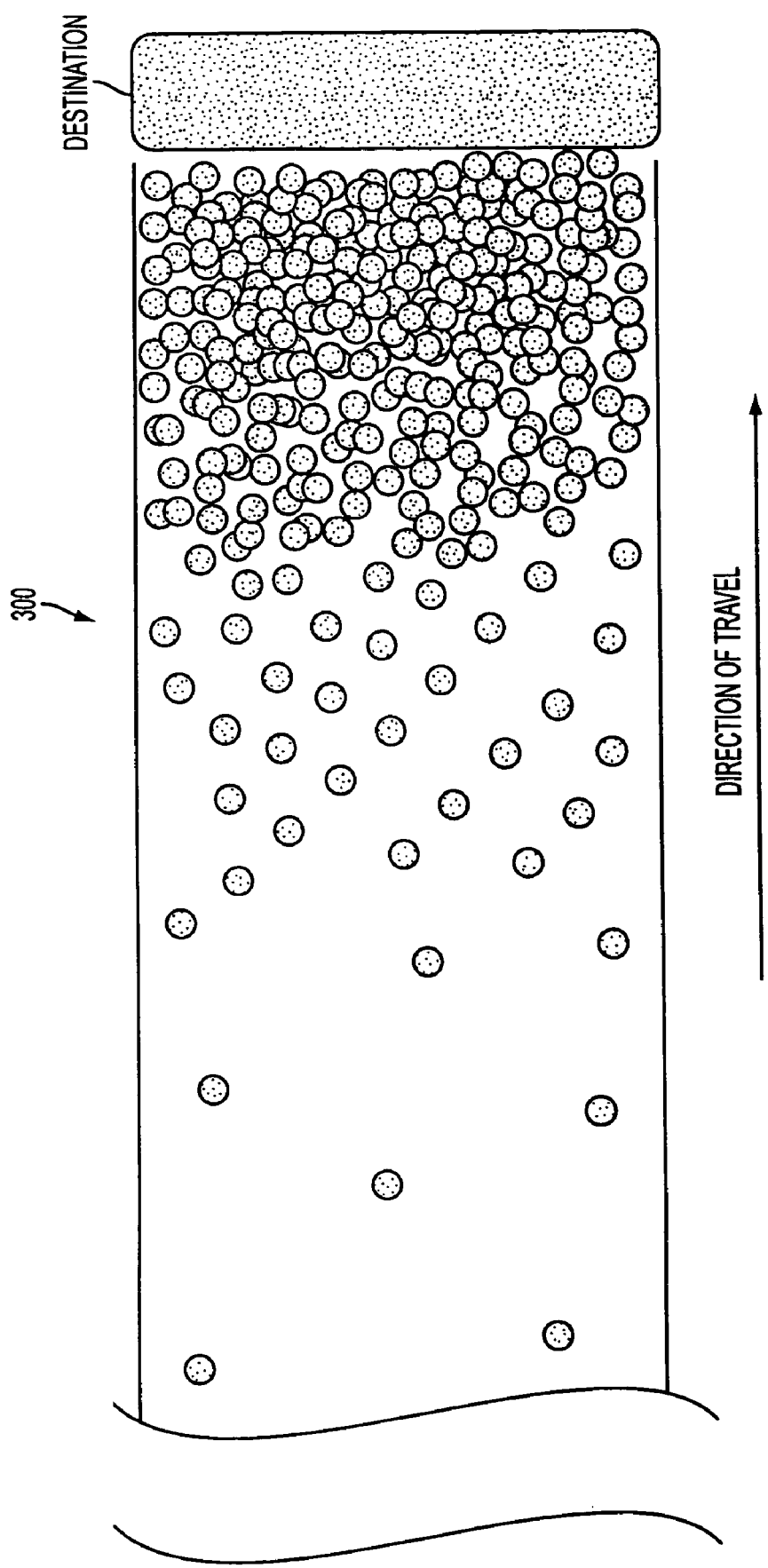
FIG. 18 is a diagram schematically showing a state of dense/coarse of objects according to the first embodiment of this invention.

FIG. 18 is a diagram schematically showing the dense/coarse state of objects according to the first embodiment of this invention, representing a state of car jam. A virtual range 300 shown in FIG. 18 is an image of the database, representing, for example, a highway in a real space, on which a number of small balloons for detection are created. While the user travels to a destination such as a tollgate or the like on the highway, the server system 21 always monitors the position of the portable terminal 11 of the user to monitor the number of times a balloon representing the portable terminal 11 contacts with the balloons for detection (detecting the frequency). When the detected frequency of the balloons increases, the server system 21 detects that the user approaches the destination, and notifies the user that the user approaches the destination. As this, the server system 21 can obtain the state of car jam.

In more detail, the server system 21 has a measuring unit (refer to FIG. 1) for measuring the detected frequency (statistical information) relating to detection of balloons, and an estimating unit 39e (refer to FIG. 1) for estimating a distance or the like from the position information on the portable terminal 11 to the destination on the basis of the statistical information measured by the measuring unit 39d.

Figure 19:
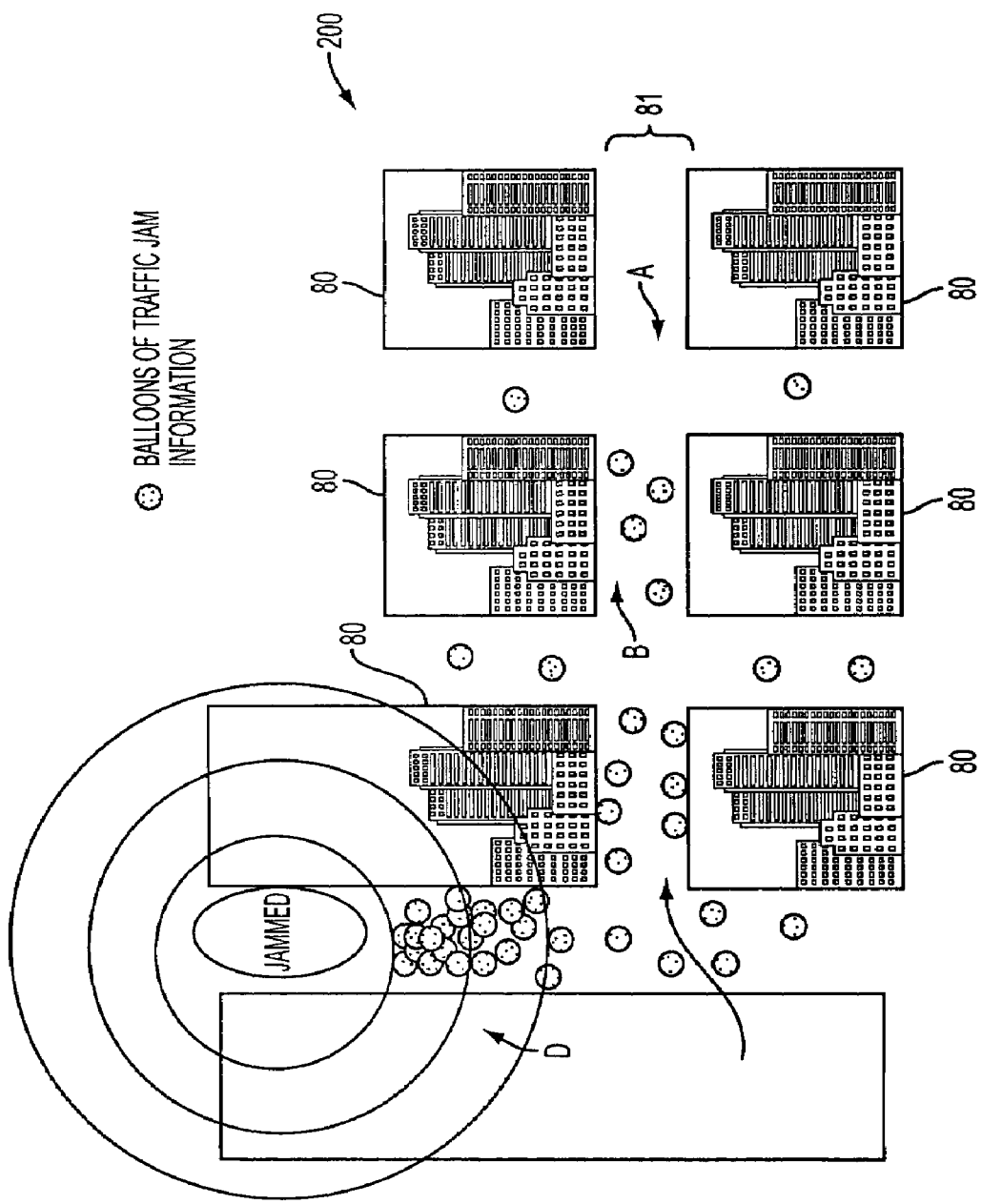
FIG. 19 is a plan view schematically showing a city area when looked from the above according to the first embodiment of this invention.

FIG. 19 is a schematic plan view of a city area when looked from the above according to the first embodiment of this invention. The city area 200 shown in FIG. 19 includes buildings 80 and roads 81. In FIG. 19, the altitude of each balloon is ignored, and each balloon is projected onto plane roads 81 and displayed. The number of detected balloons increases as the user approaches from the point A to the point D, whereas the number of detected balloons decreased as the user leaves from the point D. The server system 21 collects the number of balloons at each of the points A to D, then creates distribution information on the balloons, and compares the number of collected balloons with a threshold value of the number of balloons previously obtained. Whereby, the server system 21 can know that traffic jam occurs at the point D.

By setting an ambiguous boundary between directories, it becomes possible to not only obtain information or a service using balloons but also monitor the dense/coarse state of objects using balloons. The density can be detected by, for example, detecting the number of balloons once in ten times.

With respect to a restaurant or the like, the service thereof can be provided by setting an ambiguous boundary between the directories created for each area.

FIG. 20A is a diagram for illustrating service offer using information density according to the first embodiment of this invention. The horizontal axis of a graph shown in FIG. 20 represents time zones in one day, whereas the vertical axis thereof represents the number of advertisements of all restaurants and eating houses. When a boundary is set between directories, the number of advertisements of restaurants within a wide area can not be collected. However, by setting an ambiguous boundary between directories, it becomes possible to collect advertisements within a wide area. It is found from it that the number of advertisements of restaurants is the maximum at the lunch time, whereby the server system 21 can provide the service to the user on the basis of it.

FIG. 20B is a diagram for illustrating service offer for each menu according to the first embodiment of this invention. A graph shown in FIG. 20B represents the number of advertisements of each of Chinese noodle and spaghetti. The server system 21 provides a service for a menu of each restaurant by setting an ambiguous boundary. Since the advertisements of spaghetti is denser than the advertisements of Chinese noodle as shown in FIG. 20B, the probability that the user will hit service information relating to spaghetti is large.

The server system 21 further has a filtering unit for filtering one or plural service execution files held in the second database 9 on the basis of boundary information between plural hierarchical directories. The filter unit limits accesses to one or plural service execution files held in the second database 9 according to the boundary information between the plural directories.

Whereby, it is possible to adjust the number of accesses, using time or taste as a parameter. Thus, the second database 9 holds one or plural service execution files, adding ambiguity to boundary information.

By using a directory as boundary information defining a range in which a service can be used, it becomes possible to control the boundary information to cope with an increase in service information. Further, with the boundary information, it becomes possible to transfer information within the boundary information to a client, whereby the client can retrieve a service by himself/herself.

The server system of this invention is a server system which makes another apparatus other than the user terminal executes a service that the user requests according to a request from the user terminal. The server system has a storing means for relating three-dimensional real space information on the another apparatus to that apparatus, an obtaining means for obtaining position information on the user terminal, and a controlling means for identifying an apparatus that executes a service that the user requests from the position information on the user terminal obtained by the obtaining means and the three-dimensional space information stored in the storing means, and making the identified apparatus execute the service.

Further, the server system of this invention has a storing means for relating three-dimensional space information on other plural apparatuses and storing the information, an obtaining means for obtaining position information on the user terminal, and a controlling means for identifying a first apparatus having necessary information to execute a service that the user requests from the position information on the user terminal obtained by the obtaining means and the three-dimensional space information stored in the storing means, identifying a second apparatus which executes the service that the user requests from another position information obtained thereafter and the three-dimensional space information stored in the storing means, and making the second apparatus execute the service, using information of the first apparatus necessary to execute the service.

Further, it is possible to generalize the method of filtering by setting an ambiguous boundary.

Figure 21A:
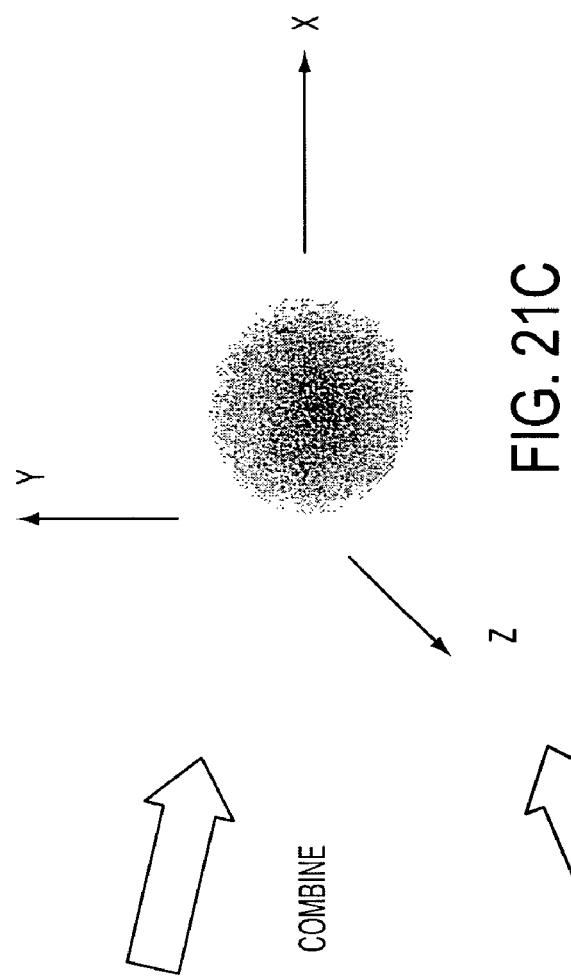
FIGS. 21A through 21C are diagrams for illustrating a method of limiting the number of accesses in n-dimension according to the first embodiment of this invention.
Figure 21B:
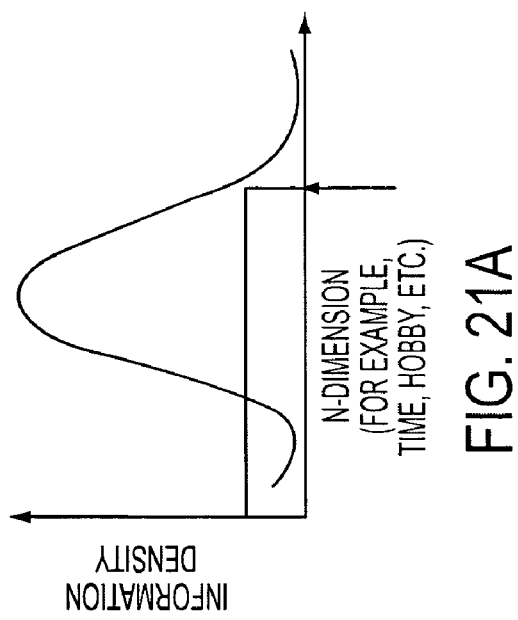
Figure 21C:
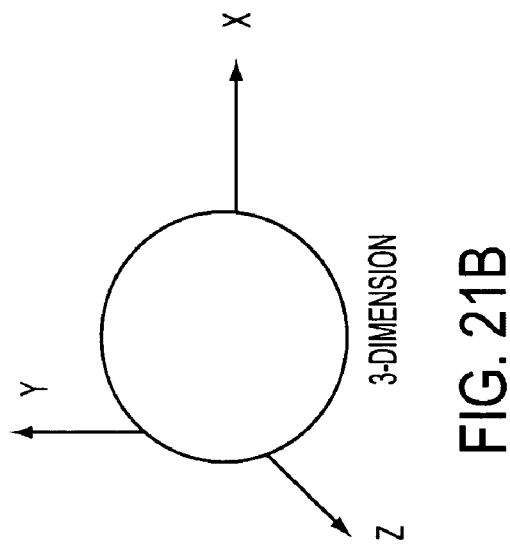

FIGS. 21A through 21C are diagrams for illustrating a method of limiting the number of accesses in n-dimension (n representing a natural number) according to the first embodiment of this invention.

When filtering is applied in n-dimension in a layer of abstracted information, the number of accesses to information defined in a virtual space linked to a real space is limited according to an ambiguous boundary.

The server system 21 obtains information density shown in FIG. 21A for each parameter, with time or taste as being a parameter. FIG. 21B shows a balloon. By combining the information density and the balloon, space information having gradation of information as shown in FIG. 21 can be constructed.

Next, a fourth modification will be described.

It is possible to give a function for effectively using a memory of the portable terminal 11.

FIG. 22 is a diagram for illustrating a method of changing an area range according to the first embodiment of this invention. Since the quantity of map data shown in FIG. 22 is extremely large, the portable terminal 11 does not need to obtain all the map data. For this, the range of the directory can be changed according to information relating to the quantity of a resource such as a memory or the like of the portable terminal 11 transmitted from the portable terminal 11.

When receiving information relating the quantity of the resource transmitted from the user terminal, the server system 21 dynamically changes a range in which the portable terminal can access to a plurality of directory layers or a range in which the portable terminal can obtain according to the quantity of the resource of the portable terminal. The server system 21 loads a file or data selected by the server 21 among a number of directories to the portable terminal 11 with respect to a file belonging to a wide category such as "Kawasaki City" directory or the like.

As above, a range defining an abstracted layer region is changed according to the quantity of the memory of the client, whereby the resource can be effectively used.

The directory can include not only files but also another directory. Namely, a system having a tree structure like a file system generally used in UNIX or the like is made equivalent to region information in a real space (that is, constructing a file system).

Defining such tree structure is equivalent to abstracting the area or region. A service in a certain area can be designated by a combination of abstracted layers. For example, when a service of "turning ON the power of TV" is used, it can be expressed as "TVpowerONservice. Room311. FujitsuLaboratory.Kawasaki.Kanagawa.Japan" (refer to FIGS. 13 and 14, for example). Namely, it can be defined as "turning ON the power of a TV set in room 311 in Fujitsu Laboratory in Kawasaki City, Kanagawa Prefecture, Japan."

In the service providing system 100, the server system can provide at any time various kinds of service information to the user, and the user can obtain service information which can be used in a wide area, the hardware can be effectively used, and the server system can limit the access from the user as required.

Since elements of latitude, longitude, altitude, azimuth and tilt angle are collected as position information, the service providing system 100 can provide various services in a wide area such as a city area or the like, using highly accurate position information data.

This service providing system 100 can be applied to a space inside a building, for example. In an area inside a building or the like, it is possible to obtain a position of the user terminal without collecting all the elements of position information.

(B) Description of Second Embodiment of the Invention

Figure 23:
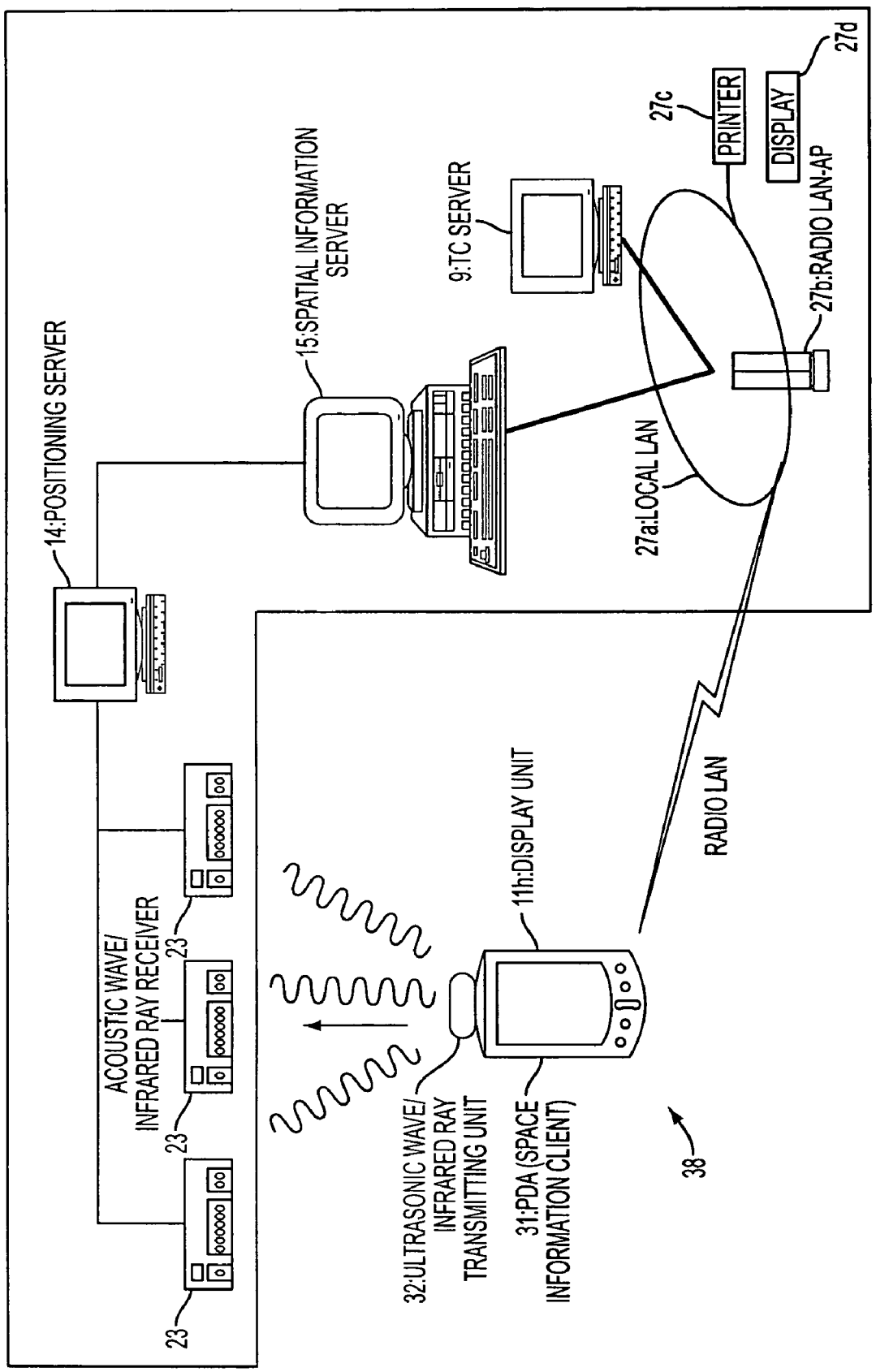
FIG. 23 is a diagram showing an example of a structure of a space information service system according to the first embodiment of this invention.

FIG. 23 is a diagram showing an example of the structure of a space information service system according to a second embodiment of this invention. A service providing system 38 shown in FIG. 23 is a system providing services to a user terminal. The service providing system 38 is constructed, for example, in a room or on a floor of a building, where the user in the room or on the floor operates a PDA (Personal Digital Assistant) 31 carried by the user to carry out an operation of outputting materials for presentation of contents of research and development or products from a printer, or of displaying the same on a display in a process with analog-like feeling. The PDA 31 does not directly operate the printing function or displaying function of a personal computer or server from a remote place, not log in a personal computer or server from a remote place, and not have a function of remotely transmitting and receiving operation messages to and from a printer or display. As will be described later, a server system 29 positions a position (space position) of the PDA 31, and performs an operation of printing or displaying previously held correspondingly to the position.

In the second embodiment, a service of an operation or process of printing, displaying or the like will be described. The service of this invention also signifies a service of delivering contents of music, video or the like, or an operation or process of turning OFF the power of a TV set in a user's house according to a request from the user outside. Practical examples of this will be described later.

The service providing system 38 provides various services to the user, having a server system 29 along with the PDA 31.

Figure 24:
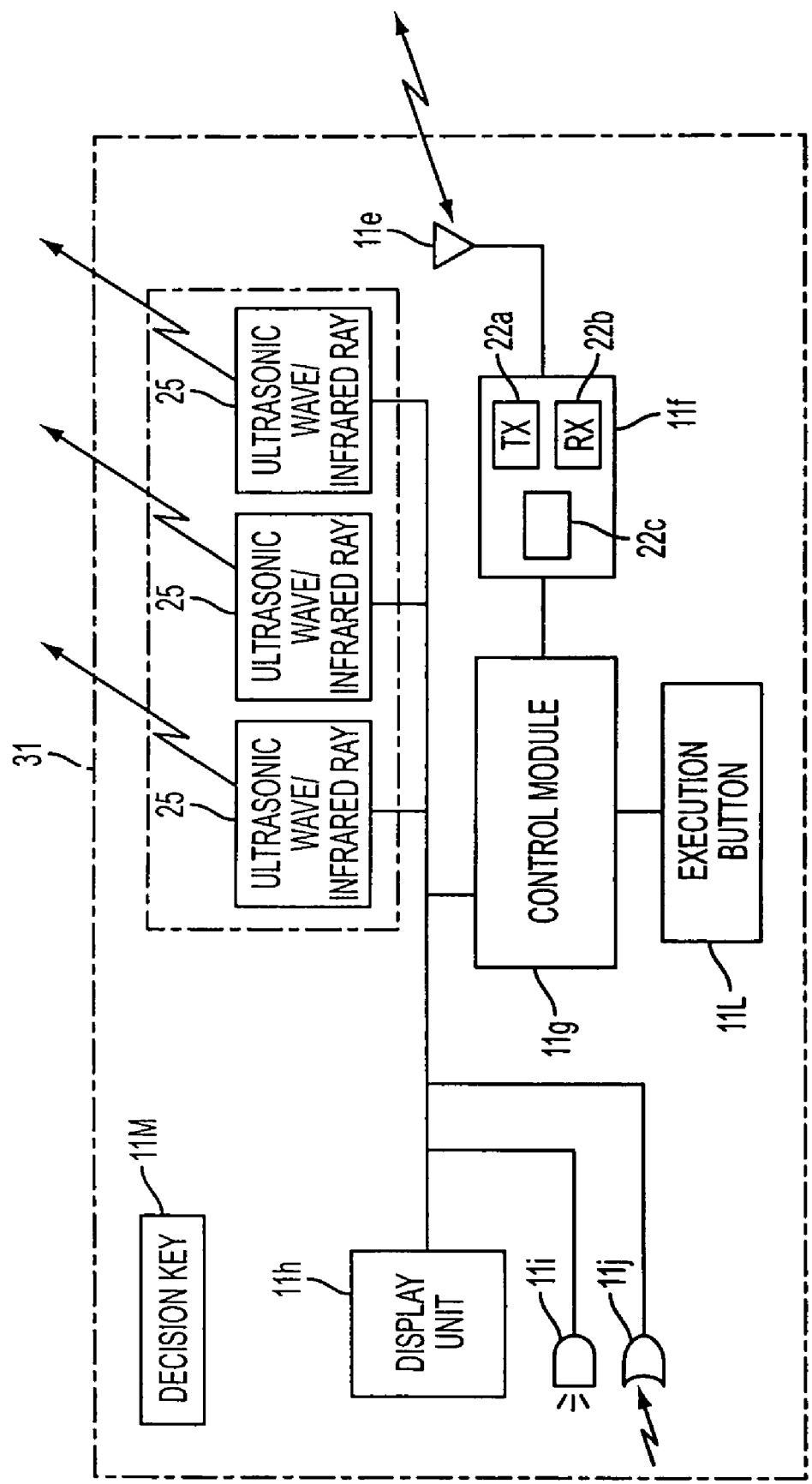
FIG. 24 is a block diagram of a PDA according to a second embodiment of this invention.

FIG. 24 is a block diagram of the PDA 31 according to the second embodiment of this invention. The PDA 31 shown in FIG. 21 has functions of transmitting/receiving radio signals over radio LAN (local Area Network) to/from the server system 29, displaying information from the server system 29, and transmitting ultrasonic wave/infrared lay used for positioning of an actual position. The PDA 31 comprises a radio signal transmitting/receiving unit including an antenna 11e, a radio module 11f, a control module 11g, an information input/output unit including an execution button (application button) 11L, a decision key 11M, a display unit 11h, a speaker 11i and a microphone 11j, and three identical ultrasonic wave/infrared ray transmitters (ultrasonic/infrared ray transmitter: hereinafter referred to as a transmission module unless not specifically mentioned) 25.

The antenna 11e is used to transmit/receive radio signals to/from the server system 29. The radio module 11f is an RF (Radio Frequency) circuit for modulating/demodulating radio signals. The control module 11g performs controls on operations of the units of the PDA 31 and a formatting process on transmitting/received data. The display unit 11h displays mainly data demodulated by the radio module 11f. The speaker 11i outputs voice according to a type of the demodulated data. The microphone 11j is used to input voice.

The execution button 11L is pressed when the user starts a position positioning operation of the PDA 31 or changes the operation mode of the PDA 31. The execution button 11L is disposed on a side face of the PDA 31 at a position where the user can press the execution button 11L while holding a casing of the PDA 31. When the user presses the execution button 11L, the ultrasonic wave/infrared ray transmitter 25 of the PDA 31 transmits ultrasonic wave and infrared ray. When receiving this ultrasonic wave and infrared ray, the service system 29 starts to position a three-dimensional position of the PDA 31.

The decision key 11M is an operation key of the PDA 31. The user presses the decision key 11M after receiving a service or information transmitted from the service system 29, whereby a receive confirmation (receive confirmation message) is notified to the service system 29. In a service of "turning OFF the power of a TV in the user's house," the user presses the decision key 11M after confirming a notification of completion of the service from the service system 29.

When a plurality of services or plural pieces of information received from the service system 29 are displayed on the display unit 11h, the user selects a desired one among them, and presses the decision key 11M. Whereby, the user can obtain a desired piece of information from plural items of, for example, news, traffic jam information, time table information, etc.

Each of the three transmitting modules 25 simultaneously transmits both ultrasonic wave and infrared ray, which functions as a light/acoustic wave transmitting unit transmitting light and acoustic wave.

Figure 25:
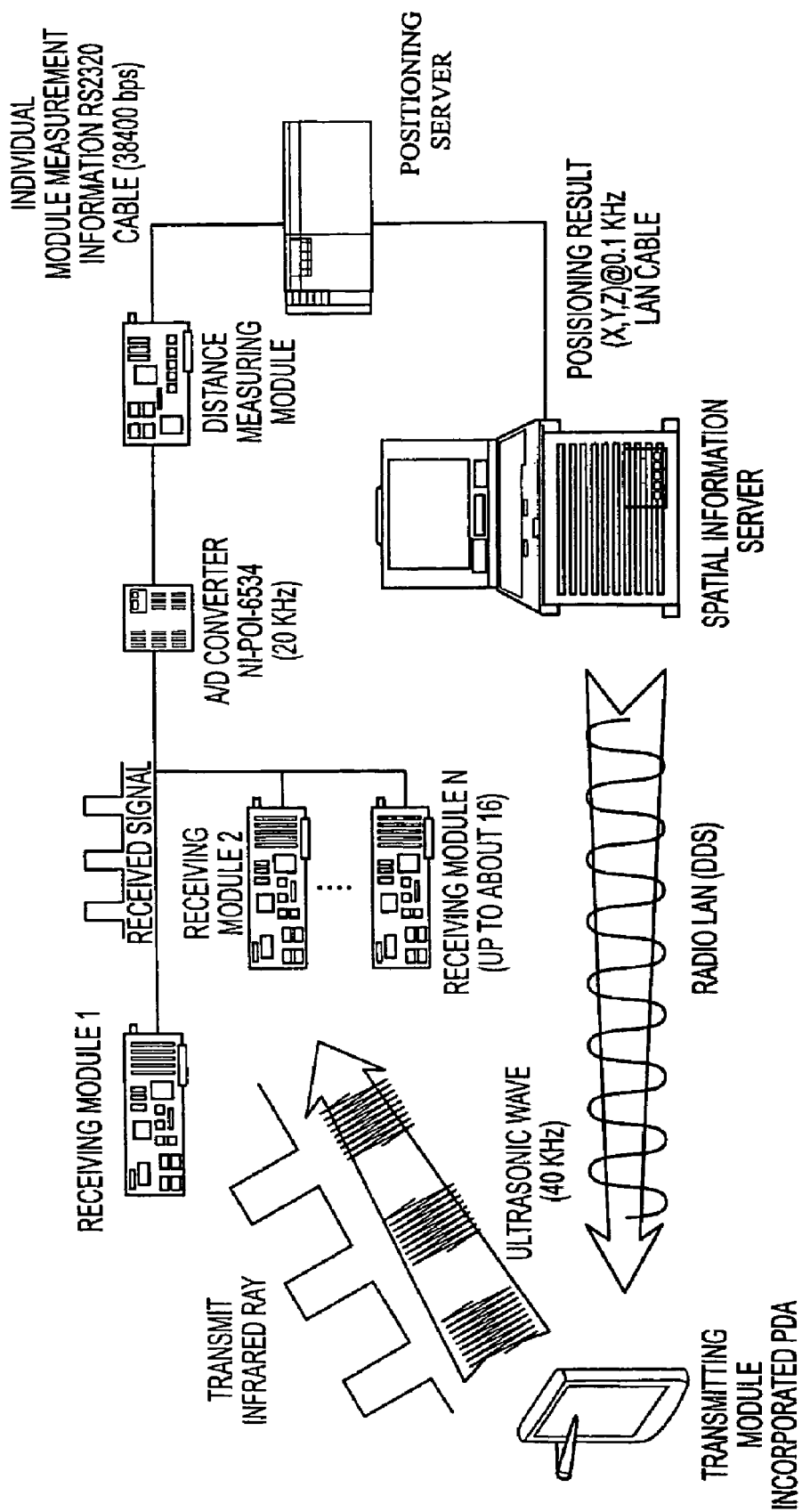
FIG. 25 is a diagram showing an example of installation of ultrasonic wave/infrared ray receivers according to the second embodiment of this invention.

FIG. 25 is a diagram showing an example of arrangement of the ultrasonic wave/infrared ray transmitters according to the second embodiment of this invention. N identical ultrasonic wave/infrared ray receivers (hereinafter referred to as receiving modules unless not specifically mentioned) of the server system 29 are fixed on the ceiling of a room shown in FIG. 25, each of which receives transmitted ultrasonic wave and infrared ray, measures a difference in receive time between the ultrasonic wave and infrared ray, and specifies a position of the PDA 31 on the basis of the difference in receive time. The ultrasonic wave/infrared ray receiver functions as a positioning unit for positioning position information on the PDA 31 on the basis of light and acoustic wave transmitted from the PDA 31. Incidentally, the ultrasonic wave/infrared ray receivers can be located at various positions according to the layout of the interior of the room, for example. An ultrasonic wave positioning method (triangulation) will be next described in more detail.

Figure 26:
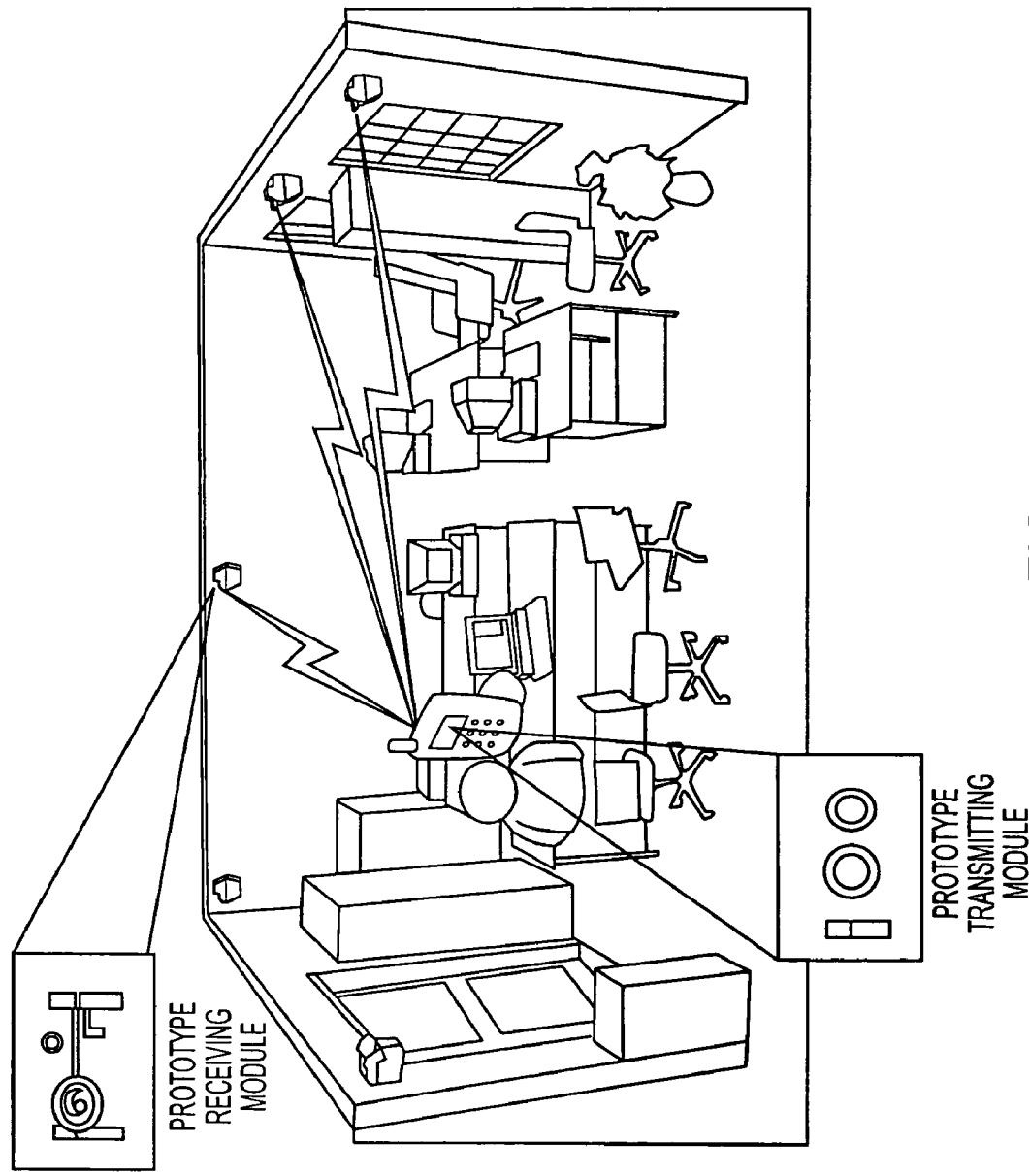
FIG. 26 is a diagram for illustrating a triangulation method according to the second embodiment of this invention.

FIG. 26 is a diagram for illustrating triangulation according to the second embodiment of this invention. Infrared ray (for example, pulse-like infrared ray) and ultrasonic wave (for example, of about 40 kHz) transmitted from the transmitting module are received by three receiving modules 1 to 3 (at least three among 16), and each of the received signals is collected to a positioning server through an AD converter and a distance measuring module. The infrared ray is instantaneously propagated to the receiving module, whereas the ultrasonic wave is propagated to the receiving module, lagging behind the arrival time of the infrared ray. The positioning server calculates a propagation distance between the receiving module and the PDA 31 using a difference in propagation time to specify the position of the PDA 31. In concrete, the positioning server obtains a hemispherical surface of a radius r1 about the receiving module 1 from a difference in time measured by the receiving module 1, thereby to find out that the PDA 31 locates at any position on the hemispherical surface. Similarly, the positioning server obtains two hemispherical surfaces of radii r2 and r3 from differences in time measured by the receiving modules 2 and 3, calculates and obtains a point at which three hemispherical surfaces of radii r1 to r3 cross, and outputs this position as the position of the PDA 31. Alternatively, the positioning server may specify the position of the PDA 31 from three-dimensional coordinates X, Y and Z, and notify the space information server of the coordinates X, Y and Z. The space information server may transmit this position to the PDA 31 to notify the PDA 31 of this position.

By providing the transmitting module to the PDA 31 and fixing the receiving modules on the ceiling of the room, a position in the three-dimensional space can be obtained in triangulation.

As the positioning method, radio LAN, RFID (Radio Frequency-Identification), etc. can be used. Other than these, there is a simple method of obtaining a position. For example, the server system 29 accurately positions the position of a server for position detection, and sets a balloon. When the PDA approaches the server and contacts with the balloon, the server system 29 recognizes the position of the server as the position of the PDA 31. Further, it is possible to obtain a more accurate position of the PDA 31 by increasing the number of the balloons or servers.

In the service providing method according to the second embodiment of this invention, the light/acoustic wave transmitting unit in the PDA 31 transmits light and acoustic wave, the positioning unit in the server system positions position information on the PDA 31 on the basis of the light and acoustic wave transmitted from the PDA 31, the extracting unit in the server system extracts a service execution file corresponding to a three-dimensional space region relating to an identifier among one or plural service execution files in the second database 9 on the basis of the position information positioned by the positioning unit and the identifier held in the space information database 15, and the service execution processing unit 8 in the server system performs the process of executing a service corresponding to service information held in the service execution file extracted by the extracting unit.

The above is a mere example of positioning, thus it is not essential in the following service offer. Any method may be applied so long as it is useful to obtain position information.

For example, transmission of both ultrasonic wave and infrared ray from the PDA 31 is not essential. It is only necessary for the service providing system 38 to collect or obtain position information on the PDA 31, and specify information or a service held in the database on the basis of the collected or obtained position information.

In the first and second embodiments, it is not necessary for the service providing system 100 or 38 to have a positioning function having accuracy appreciably higher than the number of pieces of information of balloon data, or the number of services or pieces of information held in the space information database 15 or the second database 9. In other words, it is possible to change the accuracy of position information in a three-dimensional real space according to the dense/coarse state of the number of data formed as a database.

In each of the embodiments, the portable terminal 11 or the PDA 31 may position position information on itself and transmit the positioned position information (or formatted position information) to the server system 29, the server system 29 may perform only retrieval in the database. In consideration of loads of the calculating process for obtaining position information in the user terminal (portable terminal 11, PDA 31) and the load of the calculating process of processing position information in the service system 25 or 29, it is alternatively possible to distribute the loads of the calculation. Next, the service providing method having the above structure according to the second embodiment will be described.

Figure 27:
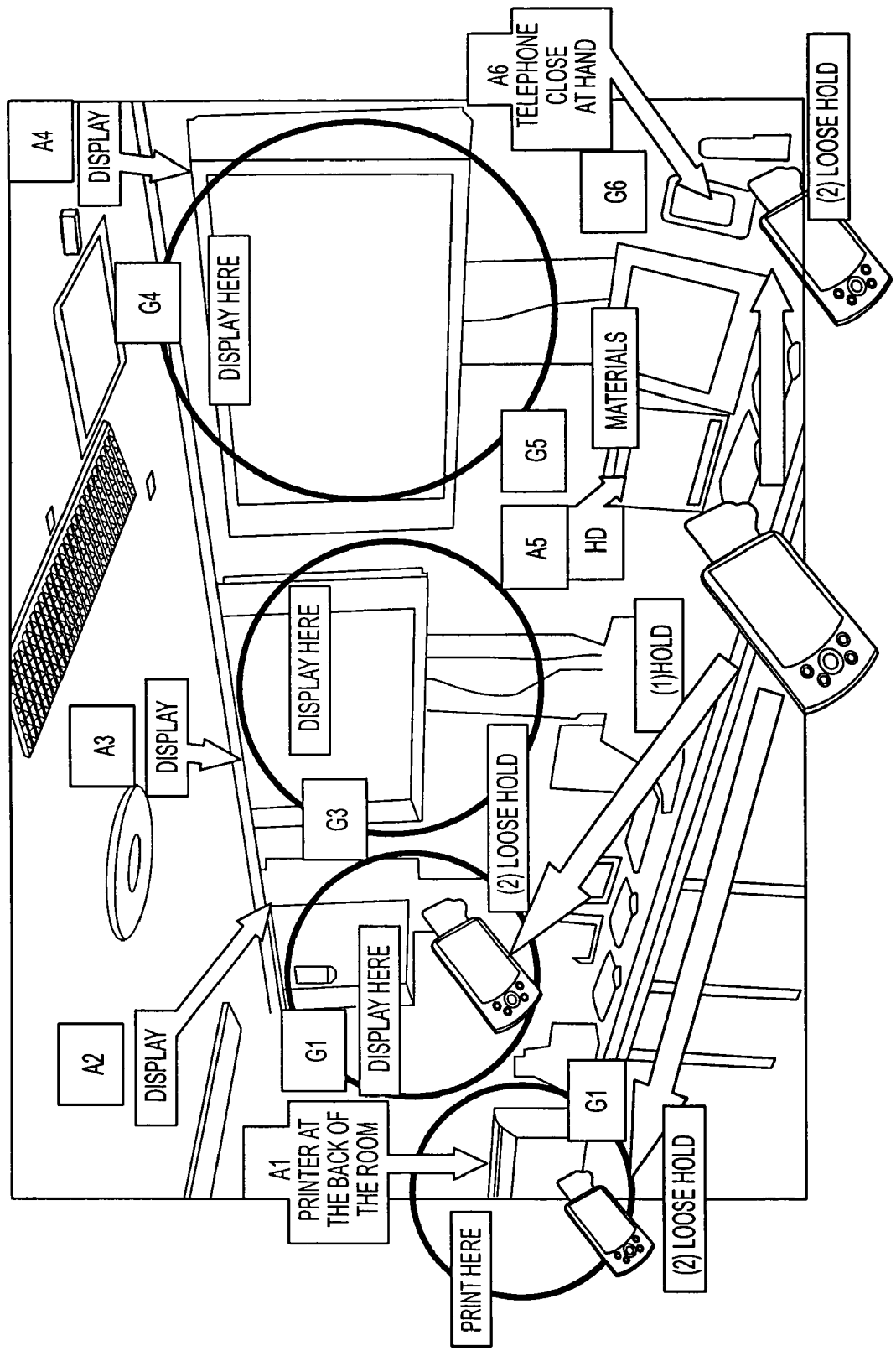
FIG. 27 is a diagram for illustrating a service providing method using a portable terminal according to the second embodiment of this invention.

FIG. 27 is a diagram for illustrating the service providing method using the portable terminal according to the second embodiment of this invention. A balloon G1 shown in FIG. 27 represents a printer A1 set in the back of the room as an image in a three-dimensional space. Balloons G2 to G4 represent displays A2 to A4 as images in the three-dimensional space.

Similarly, balloon G5 represents a body or a hard disk (HD) of a personal computer holding a file in which information desired to be displayed as an image in the three-dimensional space. Balloon G6 represents a telephone A6 put close at hand in the room as an image in the three-dimensional space.

The user stands in front of the personal computer A5 holding a file in which information that the user desires to display is held, points the PDA 31 to materials displayed on the display G4 of the personal computer A5, and presses the execution button 11L. When the user presses the execution button 11L, the file of materials displayed on the display G4 is brought into a held state (hold) [refer to (1)]. The user approaches the display A2 at the back with the file being held, and looses the hold of the execution button 11L in front of the display A2 [refer to (2)]. Whereby, the file is displayed on the display A2 in the back. This dragging method is similar to the dragging method using a mouse. Namely, the user adjusts the mouse pointer to a file (an icon or a file name displayed on the dialogue) displayed on the display, presses the left button of the mouse, and holds the file. The user adjusts the mouse pointer to a directory or a file icon that is a destination of the moving with the left button of the mouse being pressed, and releases the left button of the mouse. Whereby, the file is dragged.

The user brings the held file close to the telephone A6, and releases the execution button 11L, thereby to transmit the file to the outside beforehand set over a telephone line. Further, the user brings the held file close to the printer, and does the same operation, thereby to print the file.

The user does the above process using the PDA 31 with analog-like feeling. Next, a system or method that enables this analog process will be described in detail.

In the second embodiment, the system is required to grasp, as a premise, information in which various equipments such as printer, display, telephone, etc. are related to balloon data, which is similar to the relationship between positions of buildings in a real space and balloon data described in the first embodiment. The balloon can include various element of position information such as latitude, longitude, altitude, azimuth, tilt angle, etc.

As an arrangement in a real space of this system, three personal computers having the printer A1 and the displays A2 to A4, the personal computer A5 holding a file to be operated by the user and the telephone A6 close at hand are arranged in this order from the back in a room shown in FIG. 27.

The system recognizes that the printers and the like are arranged almost on a straight line. The system expresses the straight line and each position on the straight line by using coordinates, obtains a distance or the like from the origin as space position information. The system abstracts the printer, telephone, etc. as a printing service, a telephone calling service, etc., and relates the printer to the printing service, the display to a displaying service, and the telephone to the telephone calling service.

The system holds the center position and the radius (balloon radius) of each of balloons representing the printer, displays, etc., and gives a balloon number for identifying a balloon to each of the balloons. For example, the printer balloon is given the number "1."

As this, the system can construct a database of the balloons to be held in the second database 9 and the space information database 15.

Like the service center 19 according to the first embodiment, the service system 29 obtains desired information from the database using a program having functions as the abstracting unit and the providing unit.

As above, the balloon information in the room shown in FIG. 27 is entered in the system according to the second embodiment.

According to the second embodiment, position information on the printers and the like can be entered, using parameters such as latitude, longitude, altitude and the like as described with reference to FIG. 4. Thus, the second embodiment enables highly accurate management, like the first embodiment.

Next, operations of this service providing system will be described with reference to FIGS. 28 through 31.

FIGS. 28 through 31 are sequence diagrams for illustrating processes of the service providing system 38 according to the second embodiment of this invention.

Figure 28:
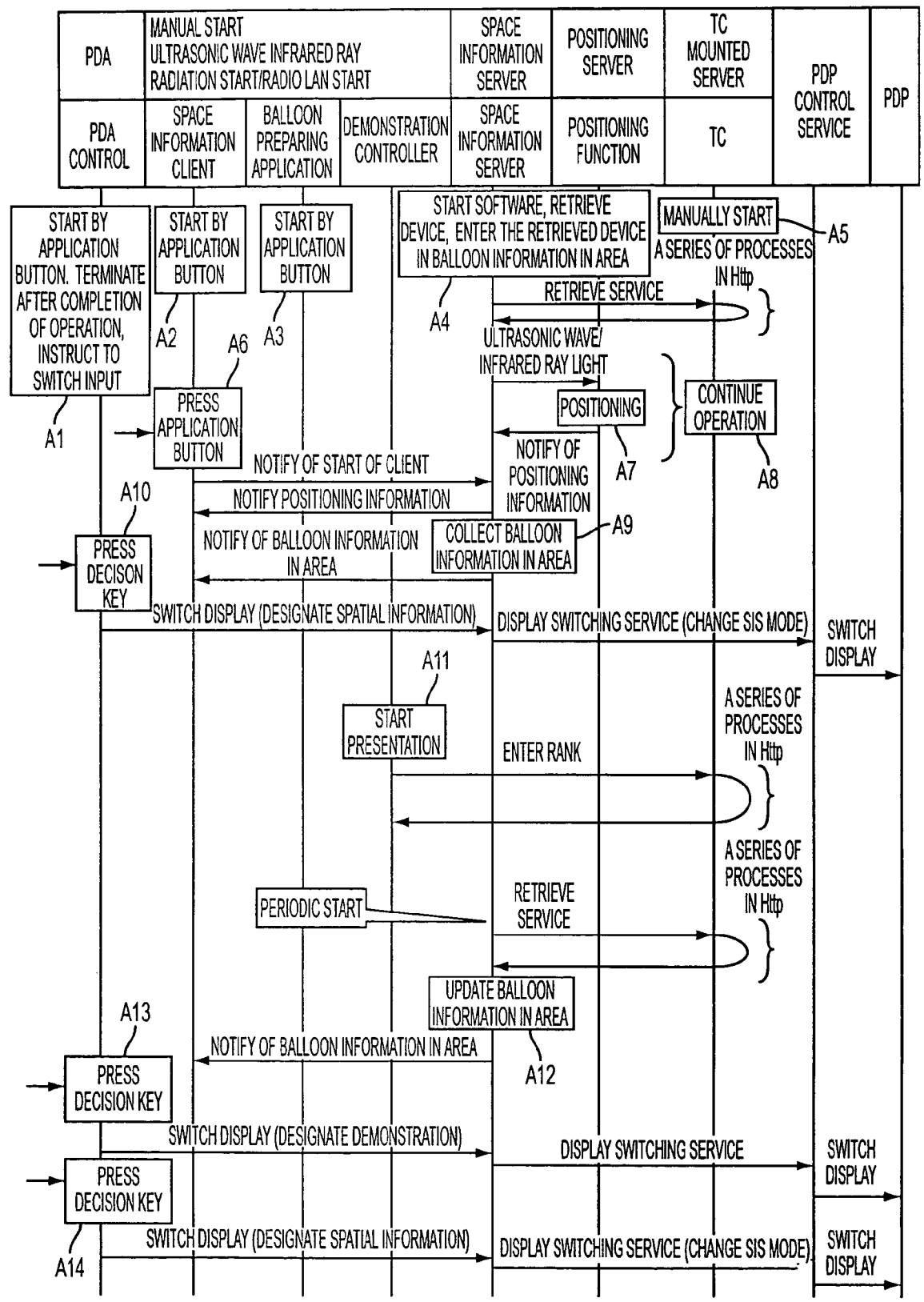
FIG. 28 is a diagram showing a sequence for reparation of a balloon according to the second embodiment of this invention.

FIG. 28 is a diagram showing a sequence for preparing a balloon according to the second embodiment of this invention.

PDA 31 is started by an application button, terminated after the operation is completed, and transmits an instruction message for switching the input (step A1). The space information client and the balloon preparing application are both started by the application button (steps A2 and A3). After started, the space information server retrieves a device, and enters the detected device to the balloon data (step S4). A TC (Task Computing) mounted server is manually started (step A5).

When the space information client presses down the application button (step A6), a start notification is transmitted to the space information server. The positioning server positions position information (step A7), and transmits positioned information to the space information server. The space information server collects balloon information in the area (step A9), and notifies the PDA 31 of positioned position information on the collected balloons in the area and balloon information. The collected information is, for example, three-dimensional space information, an attribute (for example, title) of the three-dimensional space information, a task of the same (for example, displaying), etc. The TC mounted server continues the operation of positioning (step A8).

The user selects a balloon on the basis of the received positioned position information and the balloon information in the area, and presses the decision key M11 (step A10).

When presentation or the like is started, for example (step A11), service retrieval is periodically performed, and the space information server updates the balloon in the area (step A12), and transmits the updated data to the PDA 31. The PDA 31 presses the decision key with respect to the received data (steps A13 and A14), and transmits a message to switch the display to the space information server.

Figure 29:
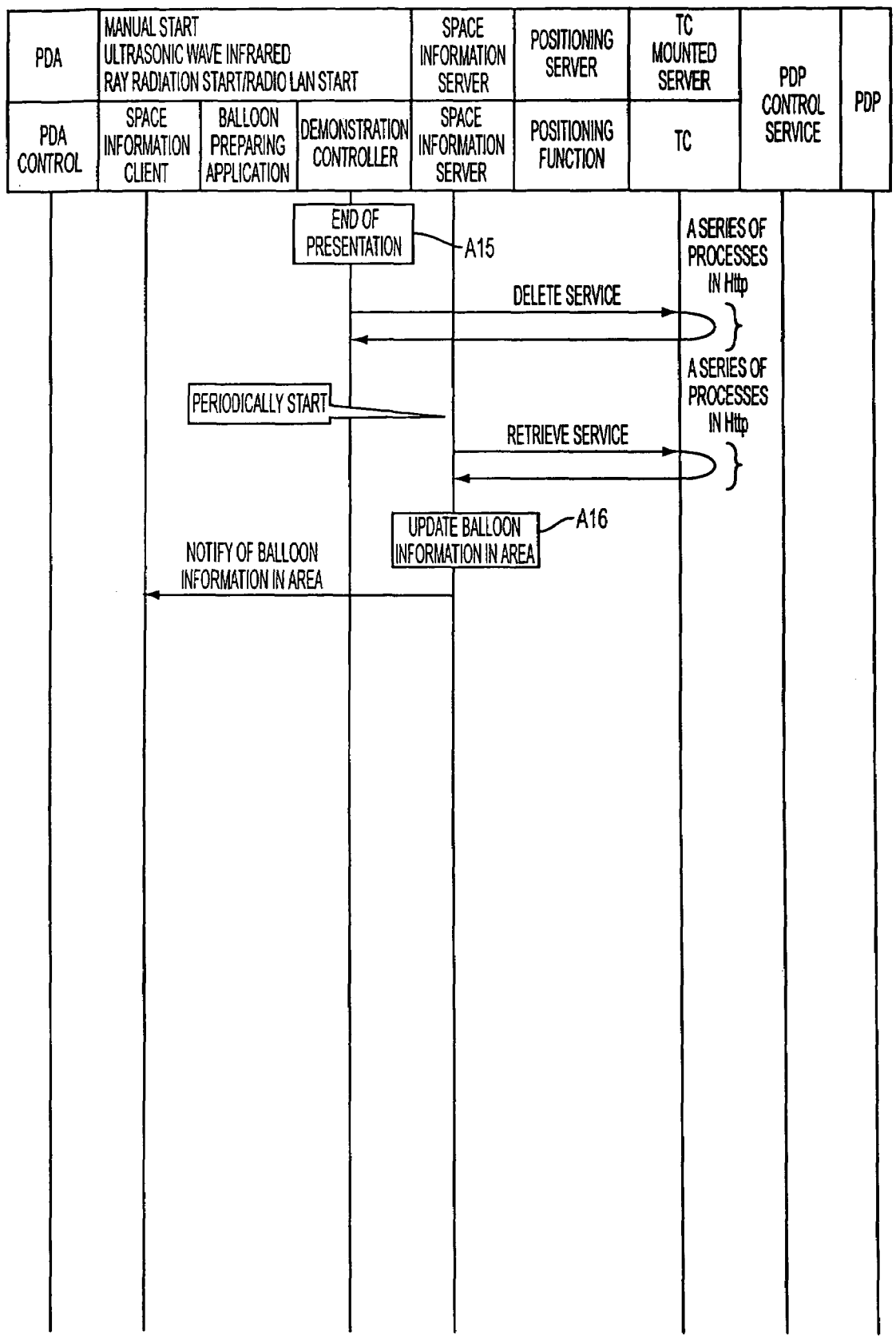
FIG. 29 is a diagram showing the sequence for reparation of the balloon according to the second embodiment of this invention.

In FIG. 29, when the presentation or the like is ended (step A15), the service is deleted. After that, the space information server updates the balloon in the area (step A16).

Figure 30:
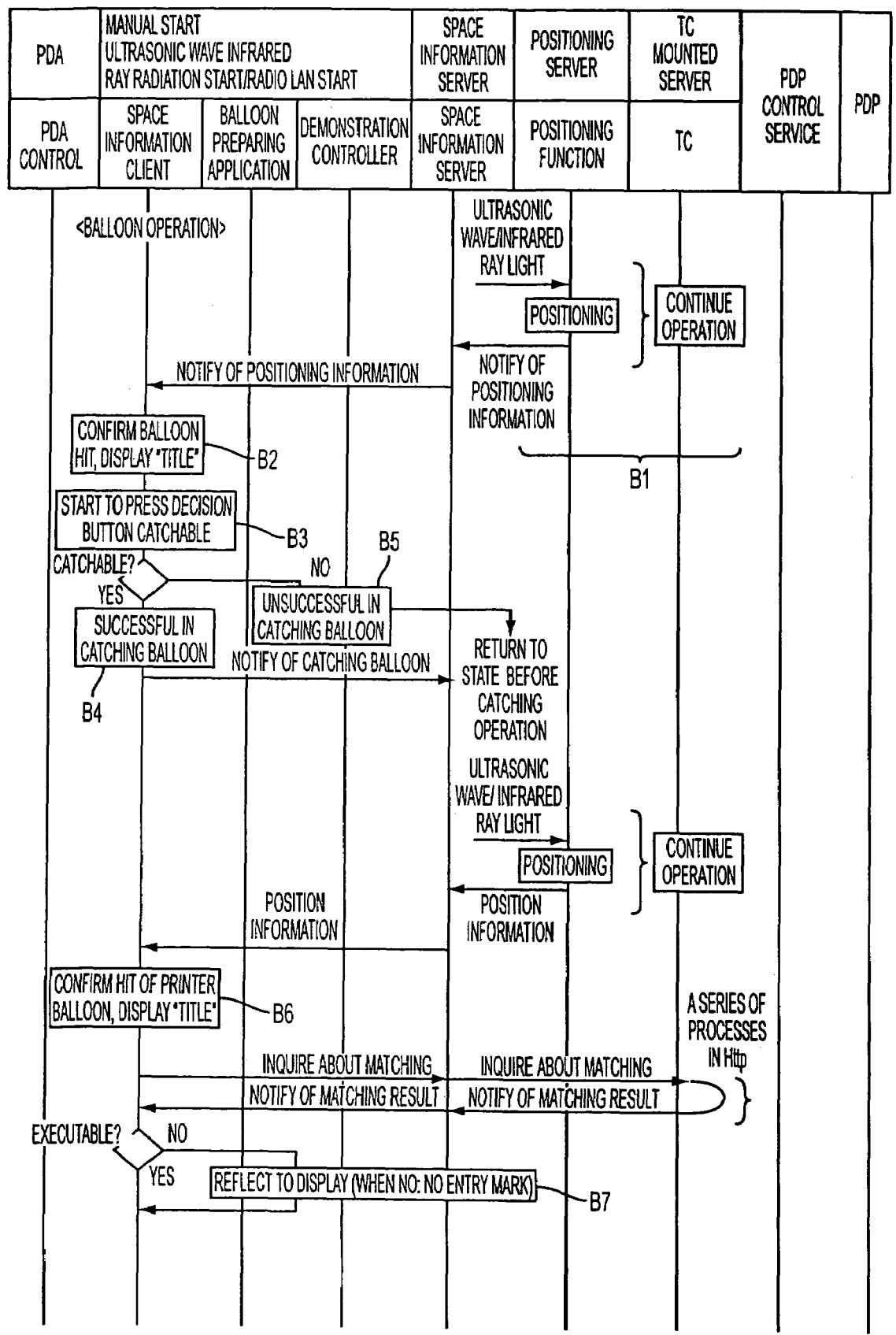
FIG. 30 is a diagram showing a sequence for an operation of the balloon according to the second embodiment of this invention.
Figure 31:
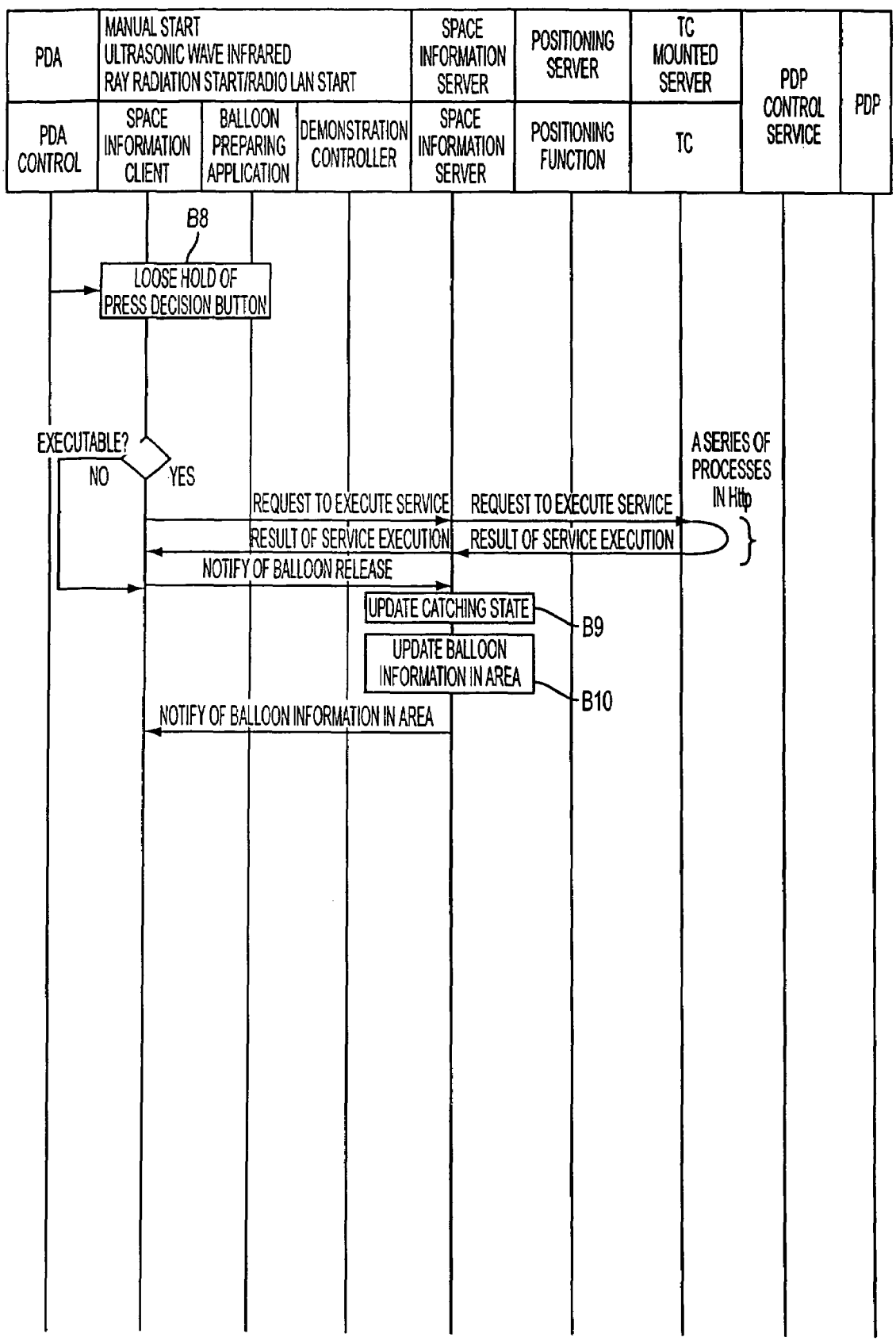
FIG. 31 is a diagram showing the sequence for the operation of the balloon according to the second embodiment of this invention.

FIG. 30 is a diagram showing a sequence of an operation of a balloon according to the second embodiment of this invention. As described above, the PDA 31 is beforehand notified of the balloon information in the area.

The positioning server and the TC mounted server both continuously perform positioning (step B1), and notify the space information client of positioned position information. The space information client confirms the first hit of a balloon on the basis of the received position information and the balloon information in the area, displays a title representing the attribute information on a printer, for example, (step B2), and starts to press the decision button (step B3). When succeeding in catching the balloon, the space information client notifies the space information server of the balloon catch. When failing to catch the balloon, the procedure returns to a state before the catching operation.

As a method of confirming a hit of a balloon, there are two ways. In the first confirming method, two kinds of information, that is, position information on the balloon and position information on the PDA 31, are relatively displayed on the display to confirm the hit. In which case, the user visually confirms a hit of the balloon with the PDA 31 on the display. "Relatively displaying on the display" is a relative relationship between the user and a balloon of a personal computer or the like at which the balloon is opened.

In another confirming method, the user beforehand approaches a place judged by the user on the basis of the user's estimation or assumption at which the user can easily hit the balloon, thereby detecting a hit of the balloon. When a balloon is developed (opened) from a specific personal computer, for example, the user approaches a position about 50 centimeters away from the personal computer, whereby the user gets to know, so to speak, sensually or intuitively that the user gets close to the balloon.

As a method of determining a balloon hit, it is possible to determine a hit not only between a person and a personal computer, but also between a printer and a telephone, for example.

The user moves while pressing the decision key 11M. When the PDA 31 confirms a hit of another balloon, the user looses the hold of the PDA 31. Namely, the user releases the holding state of the PDA 31. The user displays one title (step B6), and inquires the space information server about the matching (for example, whether printing is unsuccessful). When the user gets to know that the matching is unsuccessful from a response to the inquiry about the matching, this is reflected to the display on the PDA 31 (step B7). On the other hand, when the matching is successful, the space information client releases the decision button in FIG. 31 (step B8). The space information client then inquiries about whether the service is executable or not. When the service is not executable, the space information client transmits a message to release the balloon to the space information server. The space information server updates the catching state (step B9), and updates the balloon in the area (step B10).

"Execution of the service" corresponds to "displaying, on the PDA 31, contents of a file displayed on, for example, the computer," or "printing the contents by the printer," or "transmitting the contents over a telephone line."

Figure 32:
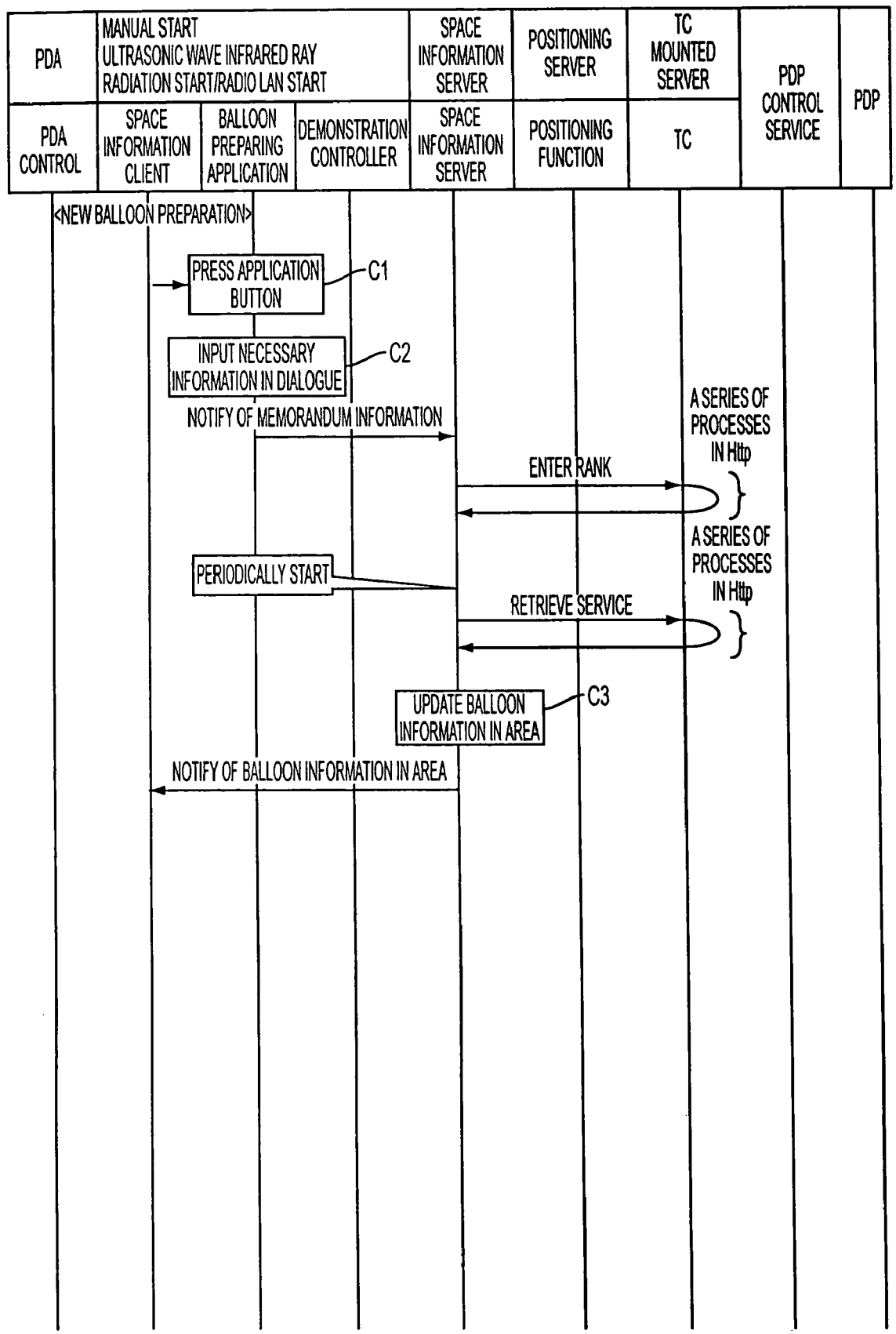
FIG. 32 is a diagram showing a sequence for preparation of a new balloon according to the second embodiment of this invention.

FIG. 32 is a diagram showing a sequence for newly creating a balloon according to the second embodiment of this invention.

When an application button is pressed (step C1), a balloon creating application is started. The user enters necessary information in dialogue (step C2), and transmits the entered information to the space information server. The space information server transmits information relating to the entering to the TC mounted server, and each process is performed therein. After retrieving a service, the information server updates the balloon in the area (step C3).

Figure 33:
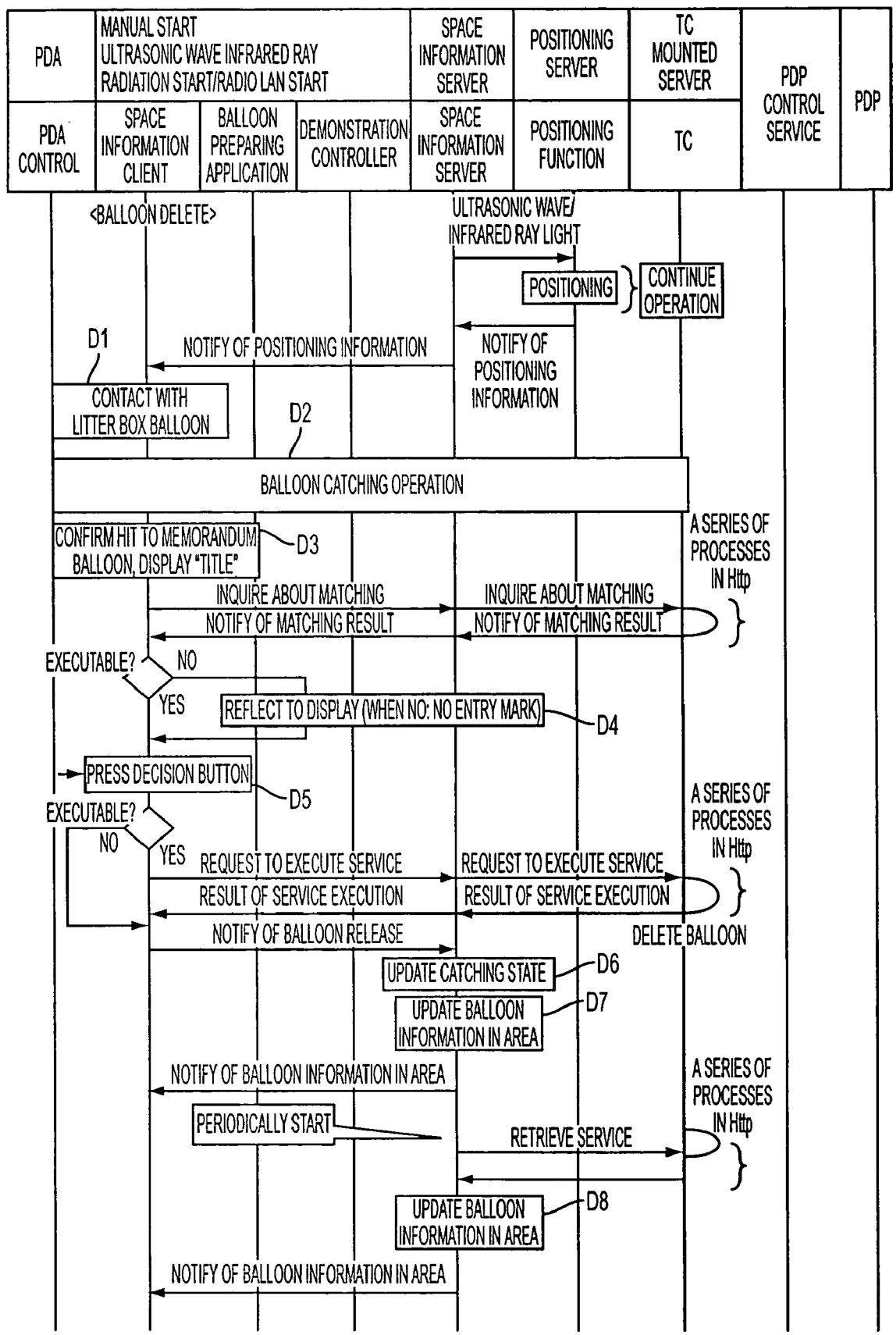
FIG. 33 is a diagram showing a sequence of deletion of a balloon according to the second embodiment of this invention.

FIG. 33 is a diagram showing a sequence for deleting a balloon according to the second embodiment of this invention.

When receiving positioned position information from the space information server, the space information client contacts with a litter box balloon (step D1), and starts the balloon catching operation (step D2). When confirming that a balloon used for memorandum is hit, the space information client displays a title thereof (step D3). After that, the space information client transmits an inquiry about the matching to the space information server, and displays a message that the matching failed when the matching is not executable as a result of the inquiry (step D4). When the matching is successful as a result of the inquiry, the space information client presses the decision button (step D5), and transmits an inquiry about whether the service is executable or not to the space information server. When notified that the service is not executable, the space information client transmits a balloon release message to the space information server.

When receiving the release message, the space information server updates the catching state (step D6), and updates the balloon in the area (step D8). Like the advantages provided by the first embodiment, the service providing system can provide various kinds of service information to the user.

Since this service providing system can be constructed in a room or the like, the user can obtain service information relating to presentation or the like. Since this service providing system can be constructed in a relatively small area, it is possible to construct a relatively low-cost system.

Since position information not deteriorated can be simply obtained, the process on elements such as latitude, longitude, altitude and the like of a number of PDAs 31 is unnecessary. Accordingly, the server system can effectively use the memory area. Since GPS is not used, it is possible to construct a service providing system whose investment cost is suppressed, and stably operate the service providing system even when a fault caused by an external factor occurs.

Although the service providing system according to the second embodiment is constructed with a personal computer, displays, a printer, a telephone, etc., the present invention is not limited to these apparatuses. The service providing system can use any apparatuses such as household goods and the like, and can be operated in the similar manner to the method according to the second embodiment.

(C) Others

Note that the present invention is not limited to the above examples, but may be modified in various ways without departing from the scope of the invention.

For example, the second database 9 can hold a device file necessary to reproduce still pictures or moving pictures in each directory.

What is claimed is:

1. A server system in a system providing services to a user terminal comprising:
    a first database that holds plural kinds of balloon data, in which each of plural pieces of three-dimensional real space range information and an identifier for identifying said three-dimensional real space range information is related to each other;
    a second database that holds one or a plurality of service execution files, in which each of plural pieces of three-dimensional space region information, which defines a three-dimensional space region that includes another three-dimensional space region or is included by another three-dimensional space region, related to said identifier in said first database and service information provided in each three-dimensional space region is related to each other;
    an extracting unit that extracts, on the basis of position information on said user terminal and an identifier held in said first database, a service execution file corresponding to a three-dimensional space region related to said identifier in said one or plural service execution files in said second database;
    a service execution processing unit that performs an executing process of a service corresponding to service information held in said service execution file extracted by said extracting unit; and an access changing unit that limits access to said one or plural service execution files held in said second database based on a shape of boundary information representing an area range in which a service can be provided, wherein said service execution processing unit transmits information on a service to be executed to said user terminal.

2. The server system according to claim 1, wherein said first database holds plural kinds of balloon data, in which each of plural pieces of three-dimensional real space range information including latitude, longitude, altitude and a balloon radius of an object in three-dimensional space and an address related to said object is related to each other;

the second database holds one or a plurality of service execution files, in which each of plural pieces of three-dimensional space region information related to an address linked to a three-dimensional real space region in said first database, service information provided in said three-dimensional space region, and one or a plurality of directories are related to one another;

said extracting unit extracts a service execution file held in said second database on the basis of position information on said user terminal transmitted from said user terminal or position information positioned by a positioning unit in said system, and an address held in said first database; and said service execution processing unit performs the execution process of a service corresponding to service information held in said service execution file extracted by said extracting unit.

3. The server system according to claim 1, wherein said first database holds plural kinds of balloon data, in which each of plural pieces of three-dimensional real space range information including latitude, longitude, altitude and a balloon radius of a building in three-dimensional and a uniform resource locator for obtaining service information relating to said building are related to each other;

said second database holds one or a plurality of service execution files, in which each of plural pieces of three-dimensional space region information related to said uniform resource locator linked to a three-dimensional real space region in said first database, service information provided in said three-dimensional space region, and one or a plurality of directories having a hierarchical structure are related to one another;

said extracting unit extracts, on the basis of position information including at least latitude, longitude and altitude of said user terminal transmitted from said user terminal or position information positioned by a positioning unit in said system on the basis of light and ultrasonic wave transmitted from said user terminal, and a uniform resource locator held in said first database, a service execution file or a directory corresponding to a three-dimensional space region related to said uniform resource locator among said one or plural service execution files or one or plural directories held in said second database; and said service execution processing unit performs the execution process of a service corresponding to service information held in said service execution file or a service execution file in said directory extracted by said extracting unit.

4. The server system according to claim 1, wherein said service execution processing unit transmits information on a service to be executed to said user terminal.

5. The server system according to claim 1, wherein said second database relates at least each of said plural pieces of three-dimensional space region information to any one of said plural directories hierarchically structured.

6. The server system according to claim 1, wherein said second database holds at least said plural pieces of three-dimensional space region information in any one of said directories, using a general-purpose OS (Operating System) having a function of managing data, files and directories.

7. The server system according to claim 6, wherein said second database assigns a file attribute representing whether or not reading and writing are possible to said service information of each of said one or plural service execution files, and holds said plural pieces of three-dimensional space region information.

8. The server system according to claim 6, wherein said second database assigns each range of said plural directories hierarchically structured on the basis of an area range in three-dimensional real space.

9. The server system according to claim 8, wherein said second database assigns each range of said plural directories hierarchically structured on the basis of said boundary information.

10. The server system according to claim 9, wherein said second database holds said one or plural service execution files, adding ambiguity information to said boundary information.

11. The server system according to claim 6, said second database identifies a directory holding said service execution file by a combination of names of said plural directories hierarchically structured.

12. The server system according to claim 6, wherein said second database specifies names of said plural directories hierarchically structured on the basis of notation specification of files and directories of said general-purpose OS.

13. The server system according to claim 6, wherein, in said second database, each directory is related to one or a plurality of subdirectories in lower hierarchy than said directory.

14. The server system according to claim 1, wherein said second database holds at least either information depending on three-dimensional space region information of said plural directories hierarchically structured or information not depending on the same with respect to said one or plural service execution files.

15. The server system according to claim 1, wherein said second database holds a definition file for recording information included in service information formed as a directory.

16. The server system according to claim 1, wherein said second database further holds service information not related to three-dimensional real space position information of said plural directories hierarchically structured.

17. The server system according to claim 1, wherein said second database holds together service information related to three-dimensional real space position information of said plural directories hierarchically structured and service information not related to said three-dimensional real space position information.

18. The server system according to claim 9 further comprises:

a filtering unit that filters said one or plural service execution files held in said second database on the basis of boundary information between said plural directories hierarchically structured.

19. The server system according to claim 18, wherein said filtering unit limits access to said one or plural service execution files held in said second database according to boundary information between said plural directories.

20. The server system according to claim 6, wherein said second database holds a device file necessary to reproduce sound, still picture or moving picture in each directory.

21. The server system according to claim 1 further comprises:
   a measuring unit that measures statistical information relating to detection of balloons representing an image of space range information; and
   an estimating unit that estimates position information on said user terminal on the basis of said statistical information measured by said measuring unit.

22. The server system according to claim 1 further comprises:
   a relative relationship defining unit that defines a relative relationship of service information included in said plural service execution files held in said second database.

23. The server system according to claim 22, wherein the range of said directory can be changed according to information relating to the quantity of resource of said user terminal transmitted from said user terminal.

24. The server system according to claim 6 further comprises:
   a service availability determining unit that is able to determine whether or not said one or plural service execution files are executable.

25. The server system according to claim 24, wherein said service availability determining unit has an initial file including service information in each directory or accessed from each directory, and comprises an accessing unit that accesses to said plural kinds of balloon data held in said first database to write, in said initial file, service execution propriety information on said one or plural pieces of service information included in said initial file.

26. The server system according to claim 24, wherein said service availability determining unit determines whether or not said one or plural service execution files are executable by referring to a parameter representing availability of a service given to each of said plural kinds of balloon data held in said first database.

27. The server system according to claim 24, wherein said service availability determining unit requests a management file of said balloon data to prepare a file describing service availability of a plurality of services belonging to said accessed directory, and determines service availability by referring to said file prepared in response to the request.

28. The server system according to claim 1 further comprises:
   an authenticating unit that authenticates propriety of service offer to said user terminal.

29. The server system according to claim 1 further comprises:
   an access controlling unit that sets access limitation to said balloon data held in said first database.

30. The server system according to claim 1, wherein, in either said first database or said second database, three-dimensional real space range information can be sequentially changed on the basis of said position information on said user terminal.

31. A service providing system providing services from a server system to a user terminal comprising:
   said server system comprising:
      a first database that holds plural kinds of balloon data, in which each of plural pieces of three-dimensional real space range information and an identifier for identifying the three-dimensional real space range information are related to each other;
      a second database that holds one or a plurality of service execution files, in which each of plural pieces of three-dimensional space region information, which defines a three-dimensional space region that includes another three-dimensional space region or is included by another three-dimensional space region, related to the identifier in said first database and service information provided in each three-dimensional space region are related to each other;
      a positioning unit that positions position information on said user terminal on the basis of light and ultrasonic wave transmitted from said user terminal;
      an extracting unit that extracts, on the basis of said position information positioned by said positioning unit and an identifier held in said first database, a service execution file corresponding to a three-dimensional space region related to said identifier among said one or plural service execution files in said second database;
      a service execution processing unit that performs an executing process of a service corresponding to service information held in said service execution file extracted by said extracting unit; and
      an access changing unit that limits access to said one or plural service execution files based on a shape of boundary information representing an area range in which a service can be provided;
   said user terminal comprising:
      a light/ultrasonic wave transmitting unit that transmits the light and ultrasonic wave;
      a transmitting unit that transmits data relating to the service operated by a user of said user terminal to said server system; and
      a receiving unit that receives information relating to a service executed by said server system on the basis of the light and ultrasonic wave transmitted from said light/ultrasonic wave transmitting unit.

32. A service providing method for providing services from a server system to a user terminal comprising the steps of:
   in said user terminal,
      transmitting, by means of a light/ultrasonic wave transmitting unit, light and ultrasonic wave;
   in said server system comprising a first database holding plural kinds of balloon data, in which each of plural pieces of three-dimensional real space range information and an identifier for identifying the three-dimensional real space range information are related to each other, and a second database holding one or a plurality of service execution files, in which each of plural pieces of three-dimensional space region information, which defines a three-dimensional space region that includes another three-dimensional space region or is included by another three-dimensional space region, related to the identifier in said first database and service information provided in each three-dimensional space region are related to each other,
      positioning, by means of a positioning unit, position information on said user terminal on the basis of light and ultrasonic wave transmitted from said user terminal;

extracting, by means of an extracting unit, on the basis of said position information positioned by said positioning unit and an identifier held in said first database, a service execution file corresponding to a three-dimensional space region related to said identifier among said one or plural service execution files in said second database;

executing, by means of a service execution processing unit, a service corresponding to service information held in said service execution file extracted by said extracting unit; and limiting access to said one or plural service execution files based on a shape of boundary information representing an area range in which a service can be provided.

* * * * *